(12) United States Patent
Huang et al.

(10) Patent No.: US 12,531,260 B2
(45) Date of Patent: Jan. 20, 2026

(54) BILAYER CERAMIC INTERCONNECT

(71) Applicant: University of South Carolina, Columbia, SC (US)

(72) Inventors: Kevin Huang, Columbia, SC (US); Xin Yang, Richland, WA (US)

(73) Assignee: University of South Carolina, Columbia, SC (US)

( * ) Notice: Subject to any disclaimer, the term of this patent is extended or adjusted under 35 U.S.C. 154(b) by 766 days.

(21) Appl. No.: 17/824,975

(22) Filed: May 26, 2022

(65) Prior Publication Data

US 2023/0033147 A1 Feb. 2, 2023

Related U.S. Application Data

(60) Provisional application No. 63/226,407, filed on Jul. 28, 2021.

(51) Int. Cl.
| | | |
|---|---|---|
| *H01M 8/243* | (2016.01) | |
| *C01G 33/00* | (2006.01) | |
| *H01M 4/86* | (2006.01) | |
| *H01M 8/12* | (2016.01) | |
| *H01M 8/2465* | (2016.01) | |

(52) U.S. Cl.
CPC .......... *H01M 8/243* (2013.01); *C01G 33/006* (2013.01); *H01M 4/8621* (2013.01); *H01M 8/2465* (2013.01); *C01P 2002/72* (2013.01); *C01P 2002/77* (2013.01); *C01P 2004/03* (2013.01); *C01P 2006/40* (2013.01); *H01M 2004/8684* (2013.01); *H01M 2008/1293* (2013.01)

(58) Field of Classification Search
None
See application file for complete search history.

(56) References Cited

U.S. PATENT DOCUMENTS

2004/0265669 A1* 12/2004 Yoo ..................... H01M 4/8621
429/535

* cited by examiner

*Primary Examiner* — Haroon S. Sheikh
(74) *Attorney, Agent, or Firm* — Offit Kurman; Douglas L. Lineberry

(57) ABSTRACT

Described herein are new solid oxide fuel cell interconnects and methods for making same that may comprise a novel bilayer construct on an anode substrate to provide a dense microstructure, low area specific resistance, and negligible oxygen permeability to form a bilayer ceramic interconnect that is a strong candidate for next-generation, durable, and low-cost tubular solid oxide fuel cells.

7 Claims, 30 Drawing Sheets

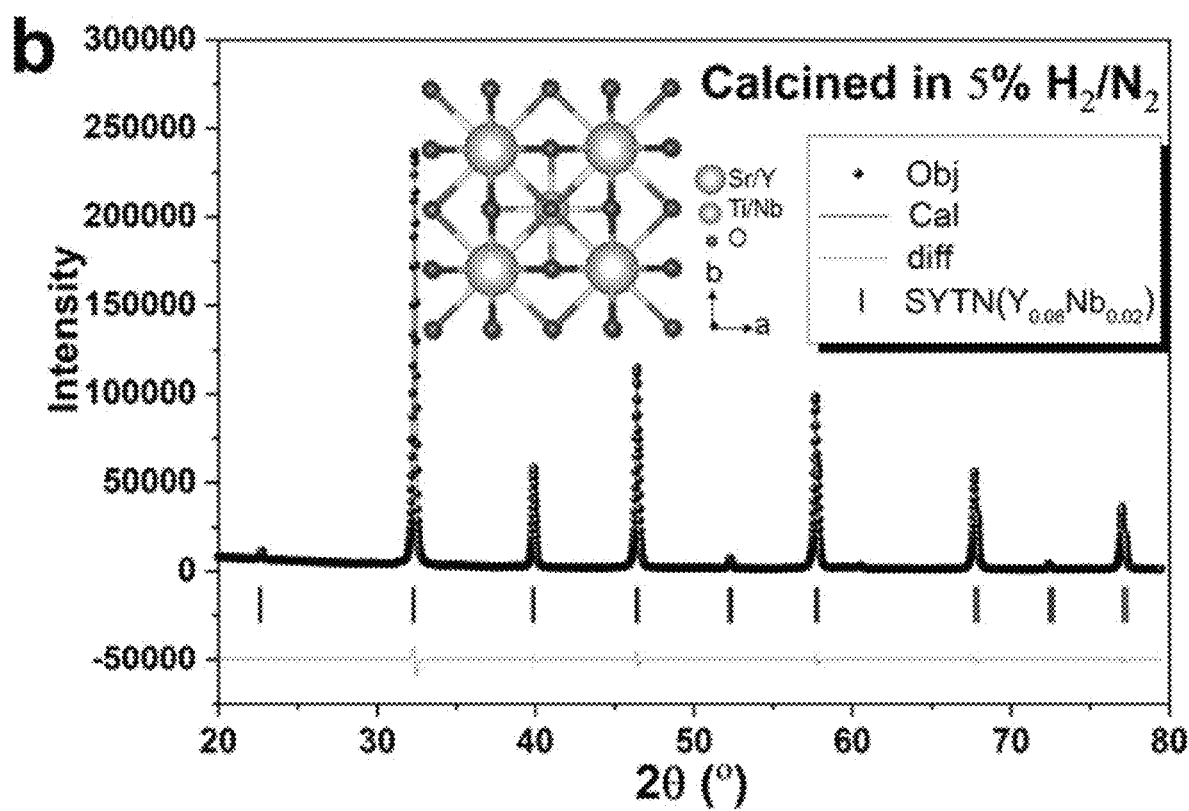
FIG. 2 (CON'T)

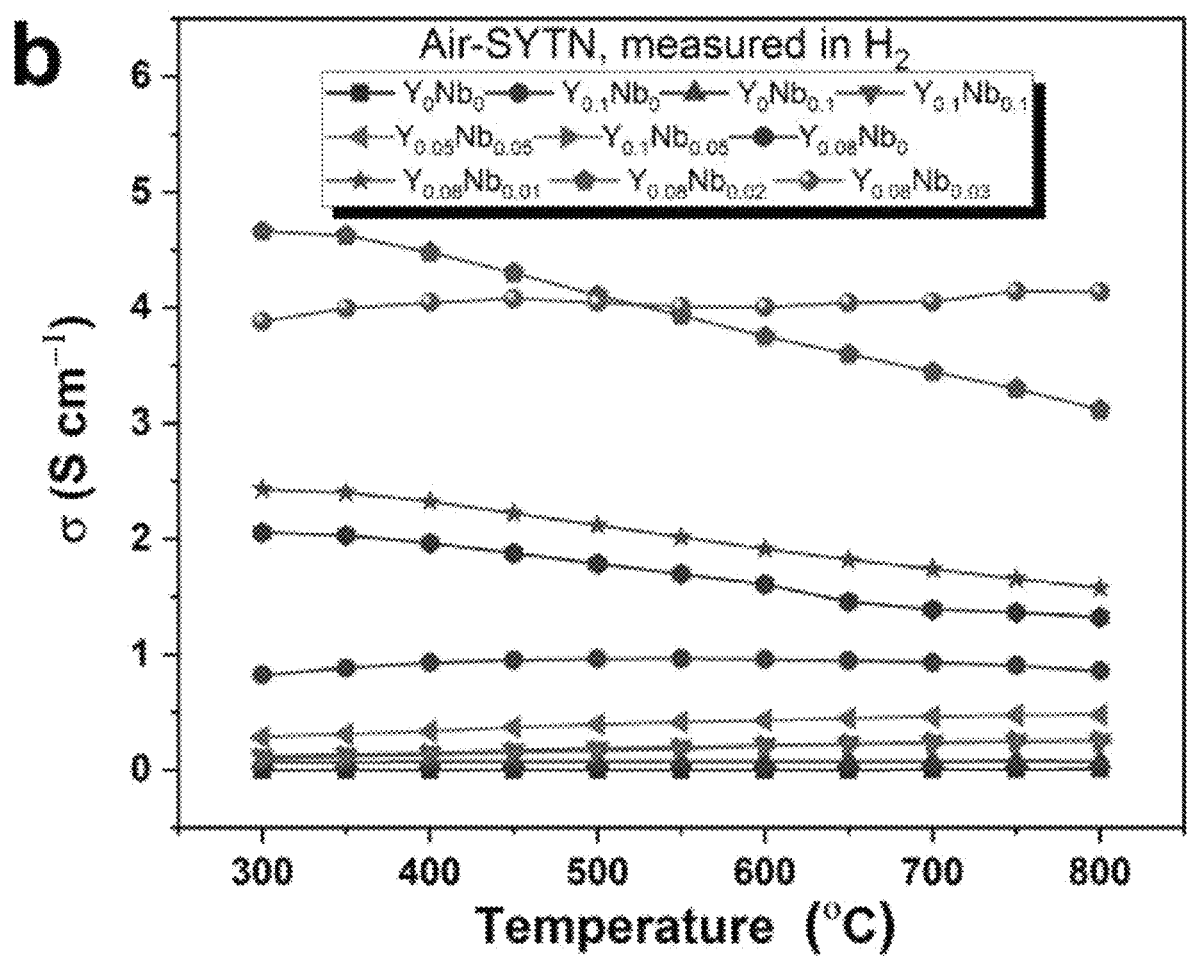
FIG. 3 (CON'T)

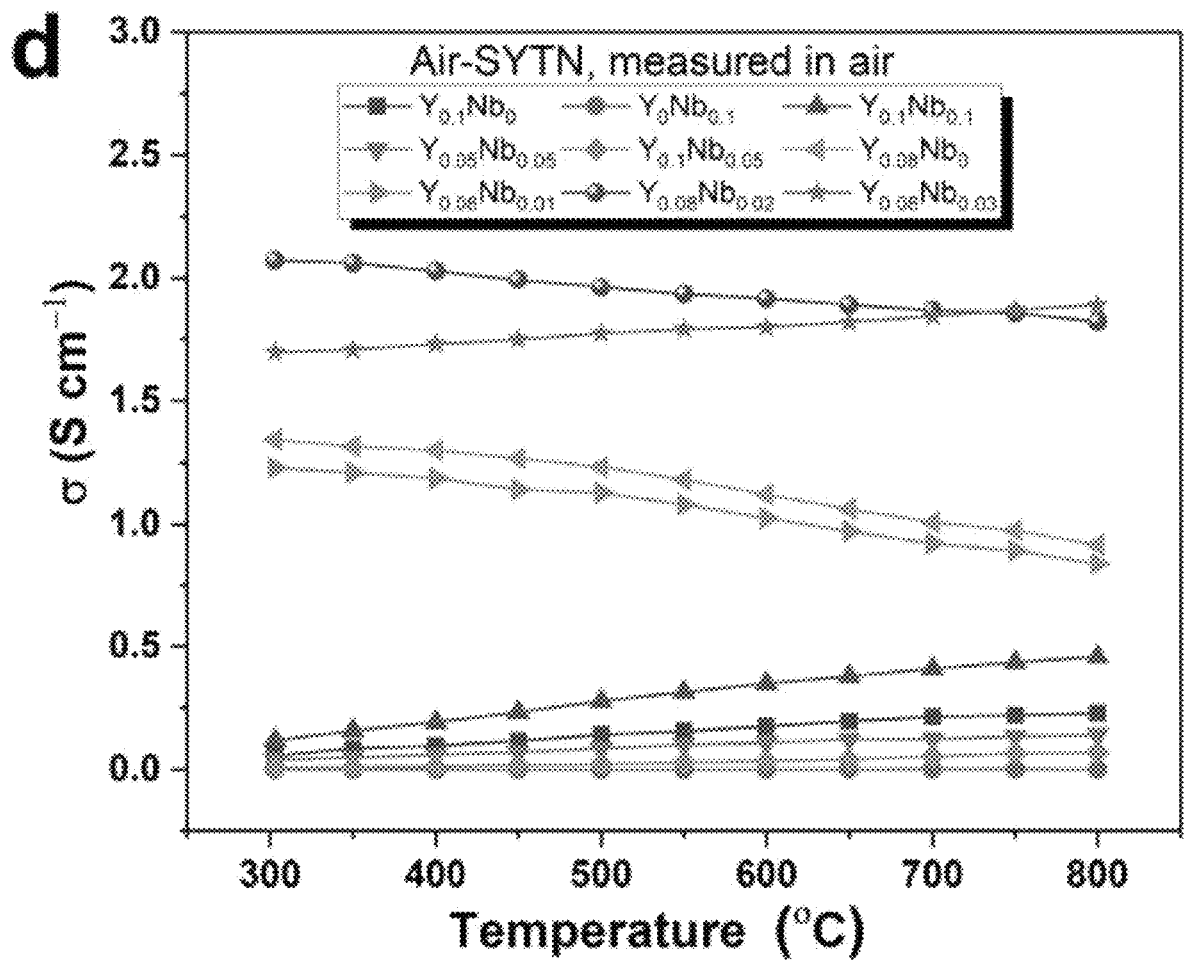
FIG. 3 (CON'T)

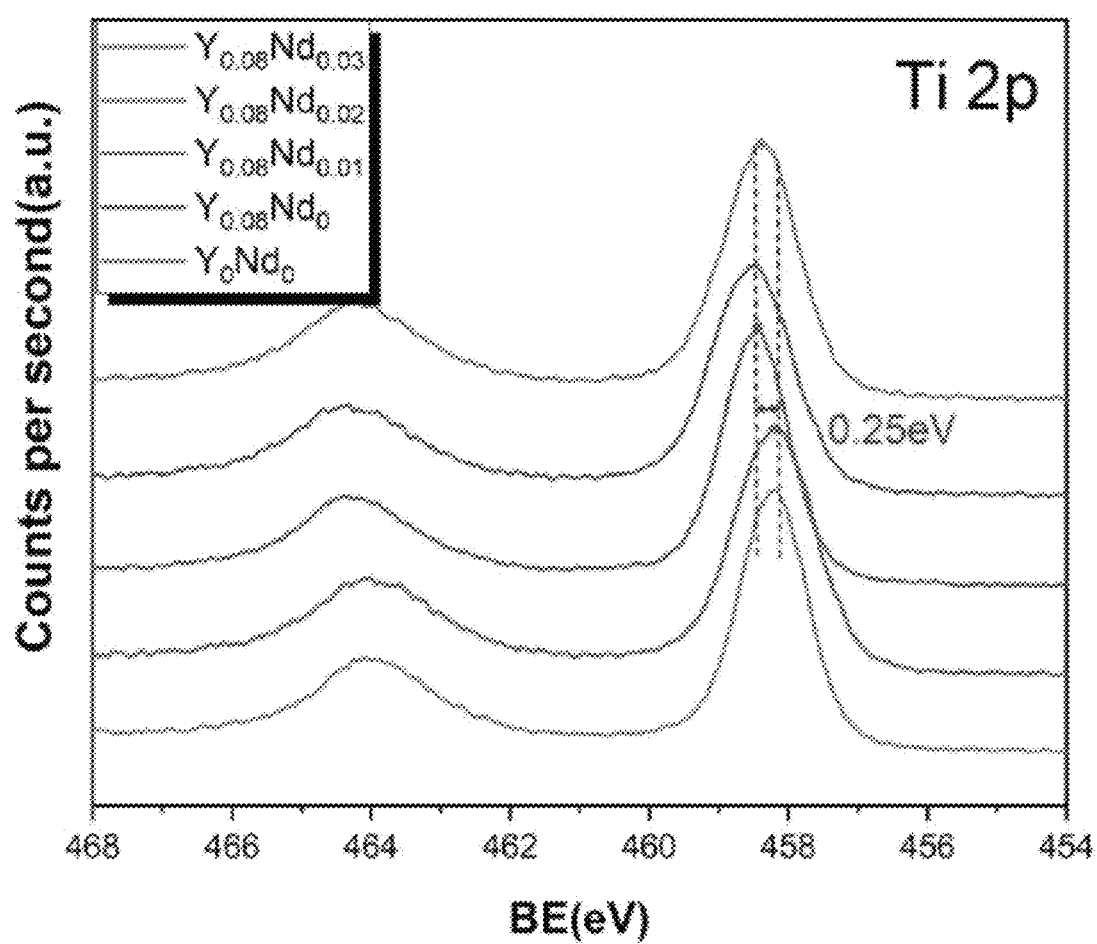
FIG. 4 (CON'T)

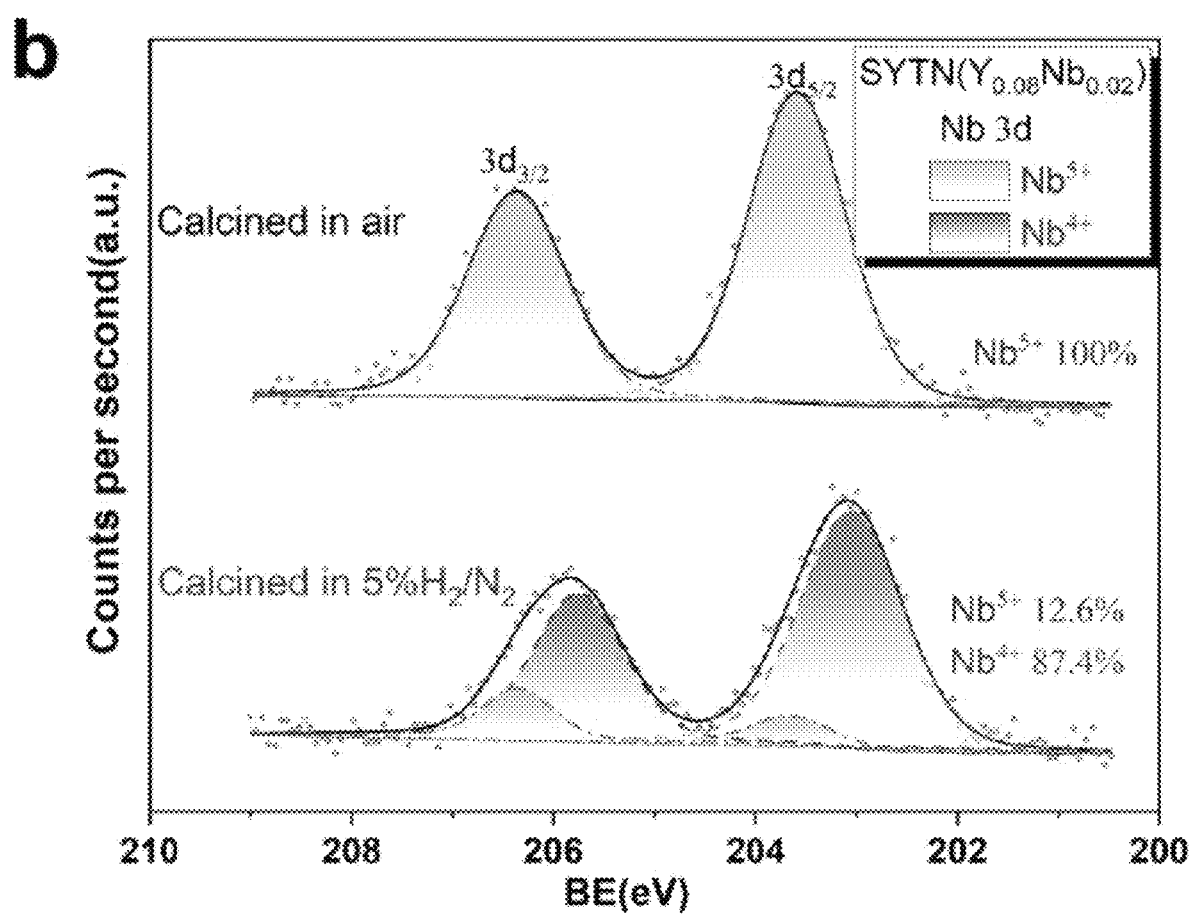
FIG. 5 (CON'T)

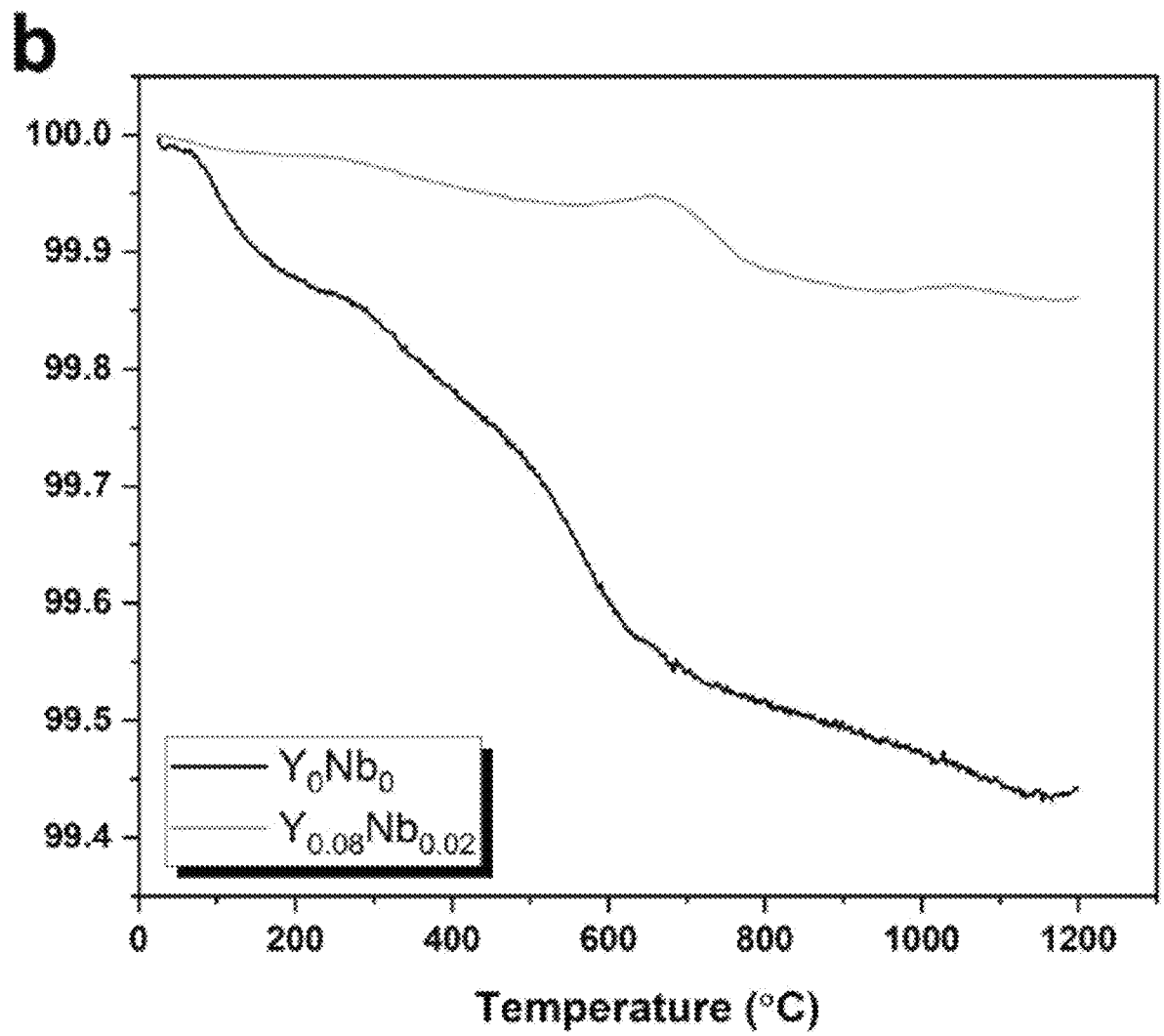
FIG. 6 (CON'T)

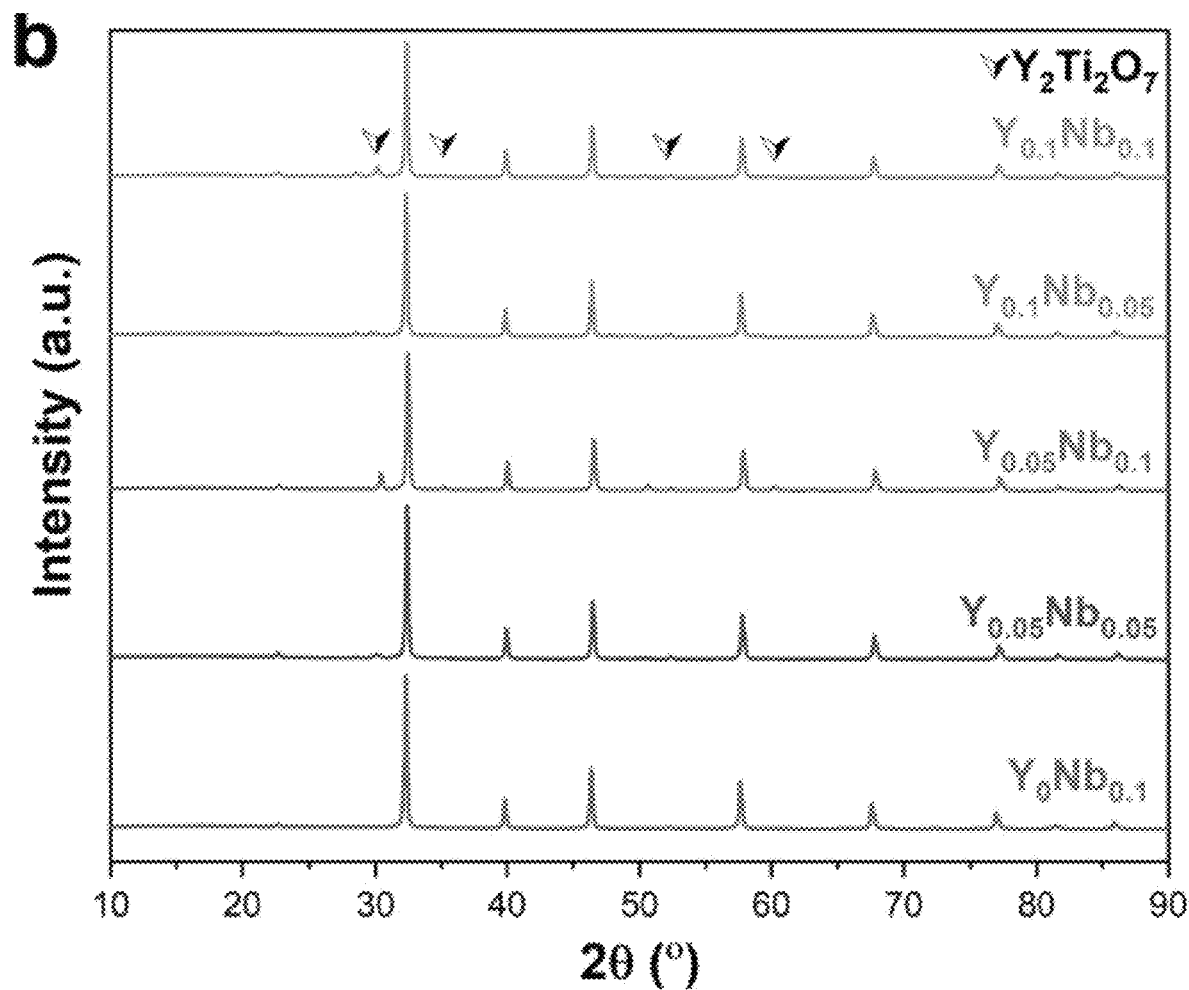
FIG. 10 (CON'T)

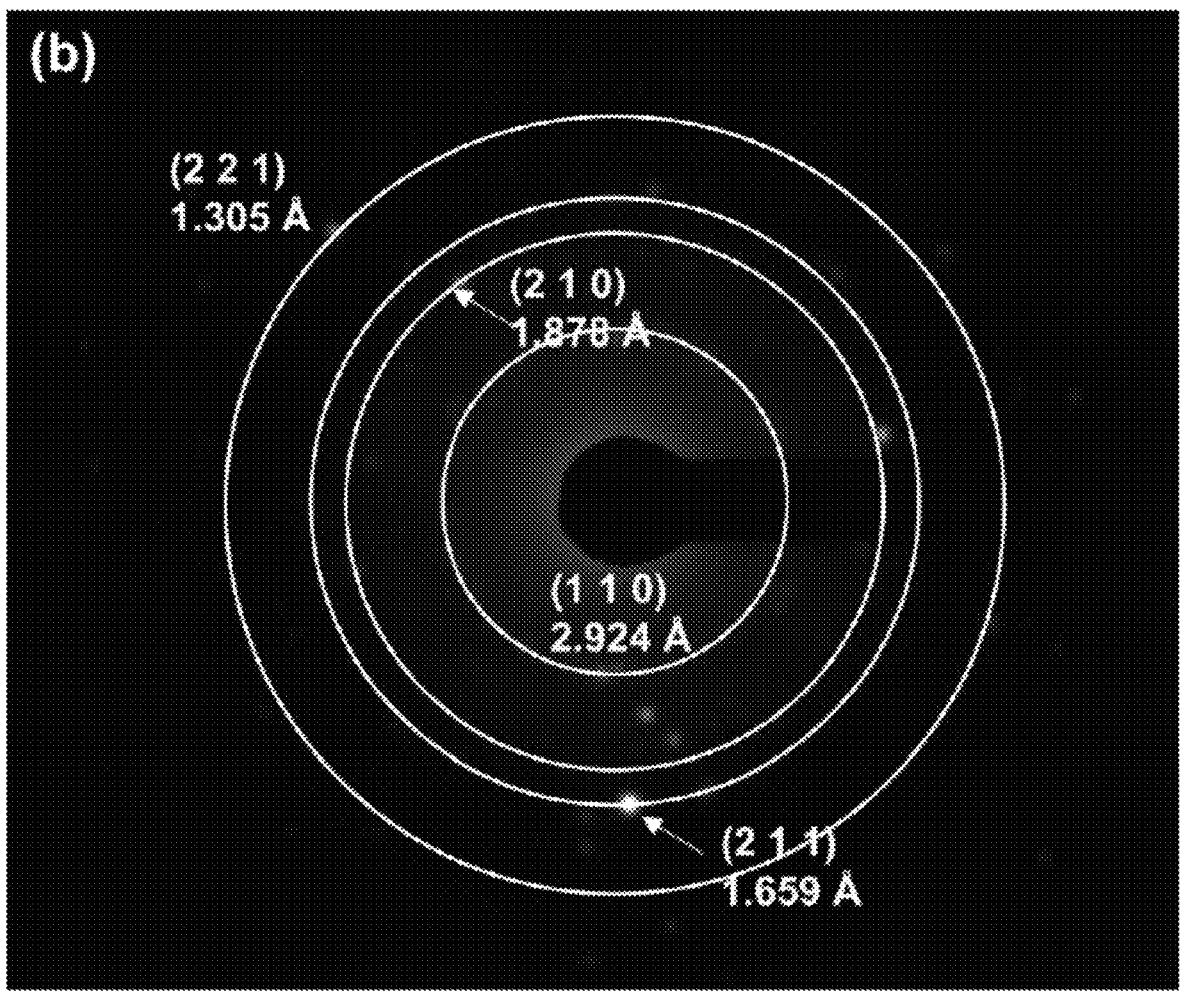
FIG. 12 (CON'T)

Table S1 Summary of refined structural parameters for air-SYTN($Y_{0.08}Nb_{0.02}$) and 5%$H_2$/$N_2$-SYTN($Y_{0.08}Nb_{0.02}$).

| | | air-SYTN($Y_{0.08}Nb_{0.02}$) | 5%$H_2$/$N_2$-SYTN($Y_{0.08}Nb_{0.02}$) |
|---|---|---|---|
| Space group | | $Pm$-$3m$ | $Pm$-$3m$ |
| Unite-cell parameters | $a$ (Å) | 3.8992 | 3.8998 |
| | $b$ (Å) | 3.8992 | 3.8998 |
| | $c$ (Å) | 3.8992 | 3.8998 |
| Occupancy | Sr | 0, 0, 0 | 0, 0, 0 |
| | Y | 0, 0, 0 | 0, 0, 0 |
| | Ti | 0.5, 0.5, 0.5 | 0.5, 0.5, 0.5 |
| | Nb | 0.5, 0.5, 0.5 | 0.5, 0.5, 0.5 |
| | O | 0, 0.5, 0.5 | 0, 0.5, 0.5 |
| $R_p$ (%) | | 5.6 | 3.2 |
| $R_{wp}$ (%) | | 6.9 | 4.6 |
| $\chi^2$ | | 2.8 | 1.9 |
| Impurity content | | 5.3% | - |

FIG. 13

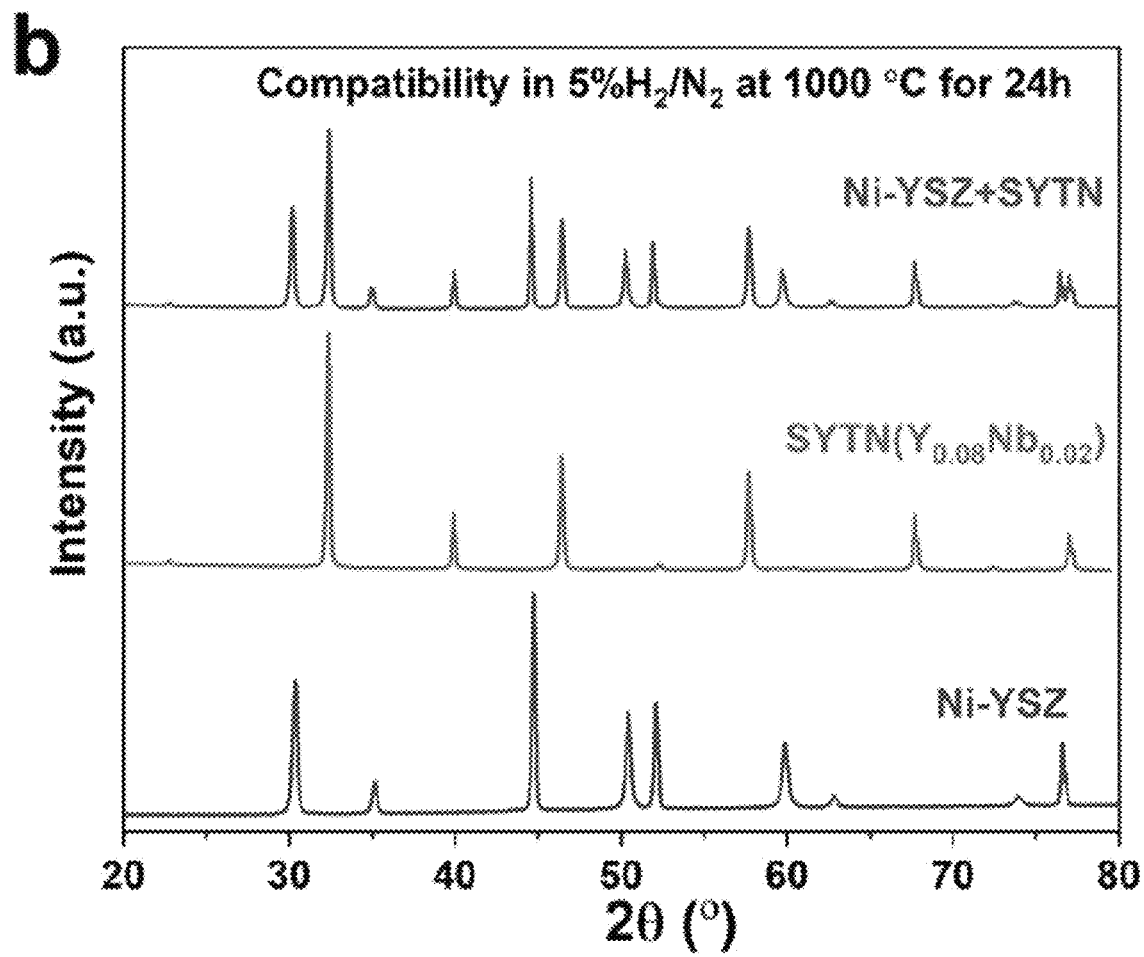
FIG. 14 (CON'T)

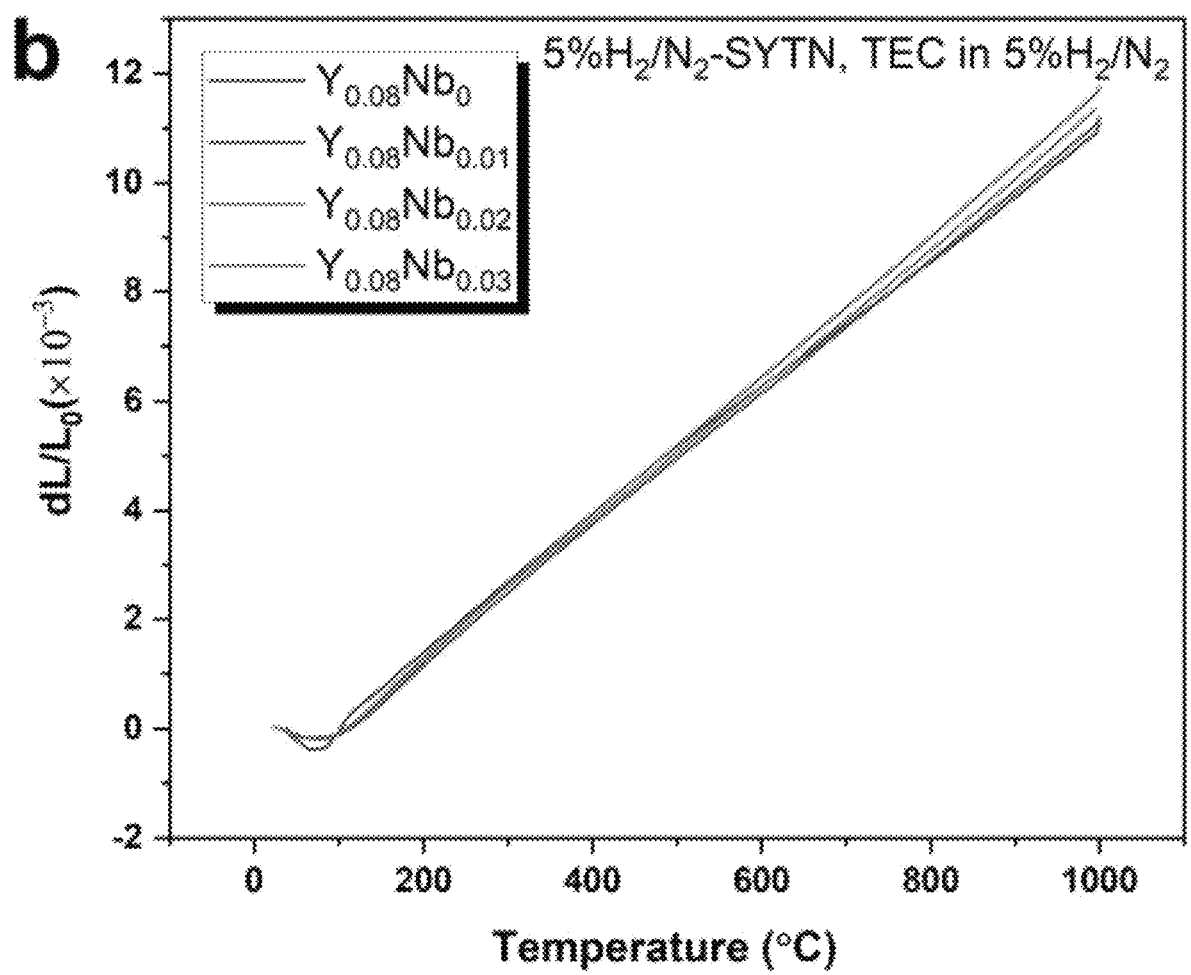
FIG. 15 (CON'T)

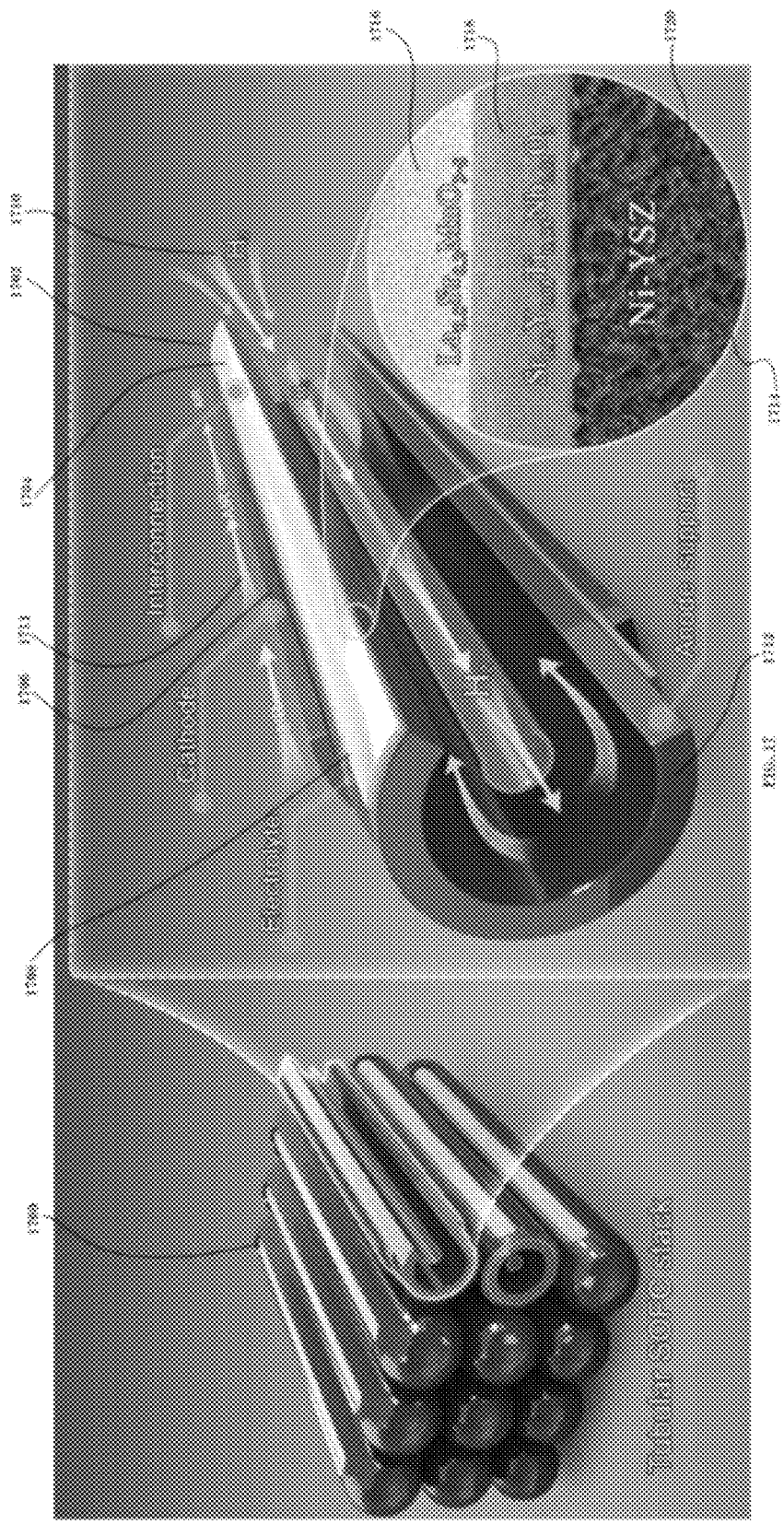

BILAYER CERAMIC INTERCONNECT

STATEMENT REGARDING FEDERALLY SPONSORED RESEARCH

This disclosure was made with government support under DE-FE0031674 awarded by Department of Energy. The government may have certain rights in the disclosure.

TECHNICAL FIELD

The subject matter disclosed herein is generally directed to Cr-free, Y- and Nb-doped $SrTiO_3-\delta$ ($Sr1-xYxTi1-yNbyO3\square\square$, SYTN, $0\leq x$, $y\leq 0.1$) as a new ceramic interconnect for fuel cells exhibiting high electrical conductivity that can be co-sintered with a Ni-YSZ anode substrate into a dense microstructure without invoking chemical reactions. Y- and Nb-doping transforms semiconducting $SrTiO_3$ into iterant large-polarons metal, confirming the high electrical conductivity. A bilayer IC consisting of $La0.8Sr0.2MnO3-\delta$ (LSM) top-layer and SYTN(Y0.08Nb0.02) under-layer on the anode substrate is also demonstrated with dense microstructure, low area specific resistance and negligible oxygen permeability. Overall, the disclosure provides a bilayer ceramic interconnect that is a strong candidate for next-generation, durable, and low-cost tubular solid oxide fuel cells.

BACKGROUND

As a key component in solid oxide fuel cell (SOFC) stacks, interconnect(s) (IC) connects the anode of one cell to the cathode of a neighboring cell to build up voltage and power, while serving as a physical barrier to prevent fuel and air from direct mixing. Its unique working environment requires it to be electronically (not ionically) conductive, microstructurally dense, mechanically strong, chemically stable in both oxidizing and reducing atmospheres. For modern planar SOFCs operated below 800° C., prefabricated high-temperature oxidation-resistant chromia former alloy sheets are the IC of choice and mechanical support of the stack.

For tubular SOFCs, however, ceramic films directly deposited on the electrode support have been used as ICs. For example, Siemens-Westinghouse cathode-supported and Atrex (now Special Power Services or SPS) anode-supported tubular SOFCs employ Ca-doped $LaCrO3$ (LCC) thin-film supported on the electrode substrate as the IC layer. From a material perspective, LCC has a reasonably high electrical conductivity in both oxidizing and reducing atmospheres and good thermal expansion match to electrolyte and electrodes. However, the major challenges to LCC-based ICs are their poor sinterability and gradual development of porosity due to Cr volatilization during extended operations. The fundamental reason for LCC's poor sinterability is rooted in the Cr-vaporization ($Cr^{+6}$) and $Cr2O3$ re-condensation mechanism occurring at the inter-particle neck during the initial sintering stage, thus inhibiting the grain growth from achieving a dense body.

To overcome the difficulty of sintering, both Siemens-Westinghouse and Atrex have used atmospheric plasma spray techniques to deposit IC films, but at increased manufacturing costs. Another issue with LCC IC is its high oxygen permeability due to the presence of oxygen vacancies created by the Ca-acceptor doping, giving rise to fuel loss and lowered efficiency.

Current $LaCrO_3$-based ceramic interconnects employed in tubular solid oxide fuel cells (SOFCs) face challenges in manufacturability, durability, and cost, primarily due to Cr volatilization issue. Accordingly, it is an object of the present disclosure to develop Cr free, easy-to-manufacture, and low-cost ceramic ICs. These will be highly desirable for tubular SOFCs and employ a new bilayer ceramic interconnect for tubular solid oxide cell bundles. This new bilayer interconnect overcomes the hurdles facing traditional interconnects in conductivity, gas leakage and cost.

Citation or identification of any document in this application is not an admission that such a document is available as prior art to the present disclosure.

SUMMARY

The above objectives are accomplished according to the present disclosure by providing in one embodiment, a ceramic interconnect. The interconnect may include a multilayer construct that includes a $La0.8Sr0.2MnO3-\delta$ (LSM) top-layer and a SYTN(Y0.08Nb0.02) bottom-layer with the multi-layer construct co-sintered with an anode substrate and the ceramic interconnect is Cr free. Further, the anode substrate includes Ni-YSZ. Again, the ceramic interconnect may form part of a solid oxide fuel cell. Still yet, the ceramic interconnect may have an electrical conductivity requirement of $\geq 1$ S cm$^{-1}$. Again still, the connect may have area specific resistance of the multilayer structure ranges from 0.580 to 0.125 $\Omega cm^2$ at 600 to 800° C.

In a further embodiment, a ceramic interconnect is provided. The interconnect may include Y and Nb doped $SrTiO_3-\delta$ ($Sr1-xYxTi1-yNbyO3-\delta$ wherein $0\leq x$, $y\leq 0.1$) and $SrTiO_3-\delta$ ($Sr1-xYxTi1-yNbyO3-\delta$ wherein $0\leq x$, $y\leq 0.1$) may be co-sintered with an anode substrate, and the ceramic interconnect is Cr free. Further again, the anode substrate may comprise Ni-YSZ. Still again further, the ceramic interconnect may form part of a solid oxide fuel cell. Yet again, the ceramic interconnect may have an electrical conductivity requirement of $\geq 1$ S cm$^{-1}$. Further again, the area specific resistance of the ceramic interconnect may range from 0.580 to 0.125 $\Omega cm^2$ at 600 to 800° C.

Further, the present disclosure provides a method for forming a ceramic interconnect. The method may include preparing at least one $Sr1-xYxTi1-yNbyO3-\delta$ powder via a solid state reaction via ball milling $SrCO3$, $Y2O3$, $TiO2$, and $Nb2O5$ in ethanol, ball milling the $Sr1-xYxTi1-yNbyO3-\delta$ powder, isopropanaol, polyvinyl butyral, triethannolamine and polyethylene glycol to form a slurry, dip-coating the slurry onto an external surface of a porous anode substrate followed by drying to form a $Sr1-xYxTi1-yNbyO3-\delta$ layer on the porous anode substrate; and clip-coating a $La_{0.8}Sr_{0.2}MnO_3$ slurry onto the $Sr1-xYxTi1-yNbyO3-\delta$ layer on the porous anode substrate and drying to form a multilayer ceramic structure. Further x may be equal to greater than 0, 0.05, 0.08, or 0.10; and y may be equal to our greater than 0, 0.01, 0.02, 0.03, 0.05, or 0.10. Still the anode substrate may comprise Ni-YSZ. Again, the method may form a solid oxide fuel cell containing the ceramic interconnect. Further yet, the method may form the ceramic interconnect to have an electrical conductivity requirement of $\geq 1$ S cm$^{-1}$. Further again, the ceramic interconnect may be Cr free. Still yet again, the method may include forming the interconnect to have an area specific resistance ranging from 0.580 to 0.125 $\Omega cm^2$ at 600 to 800° C.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 13 shows Table S1.

FIG. 17 shows a tubular stack of solid oxide fuel cells and a fuel cell employing an interconnect of the current disclosure.

Figure 1:
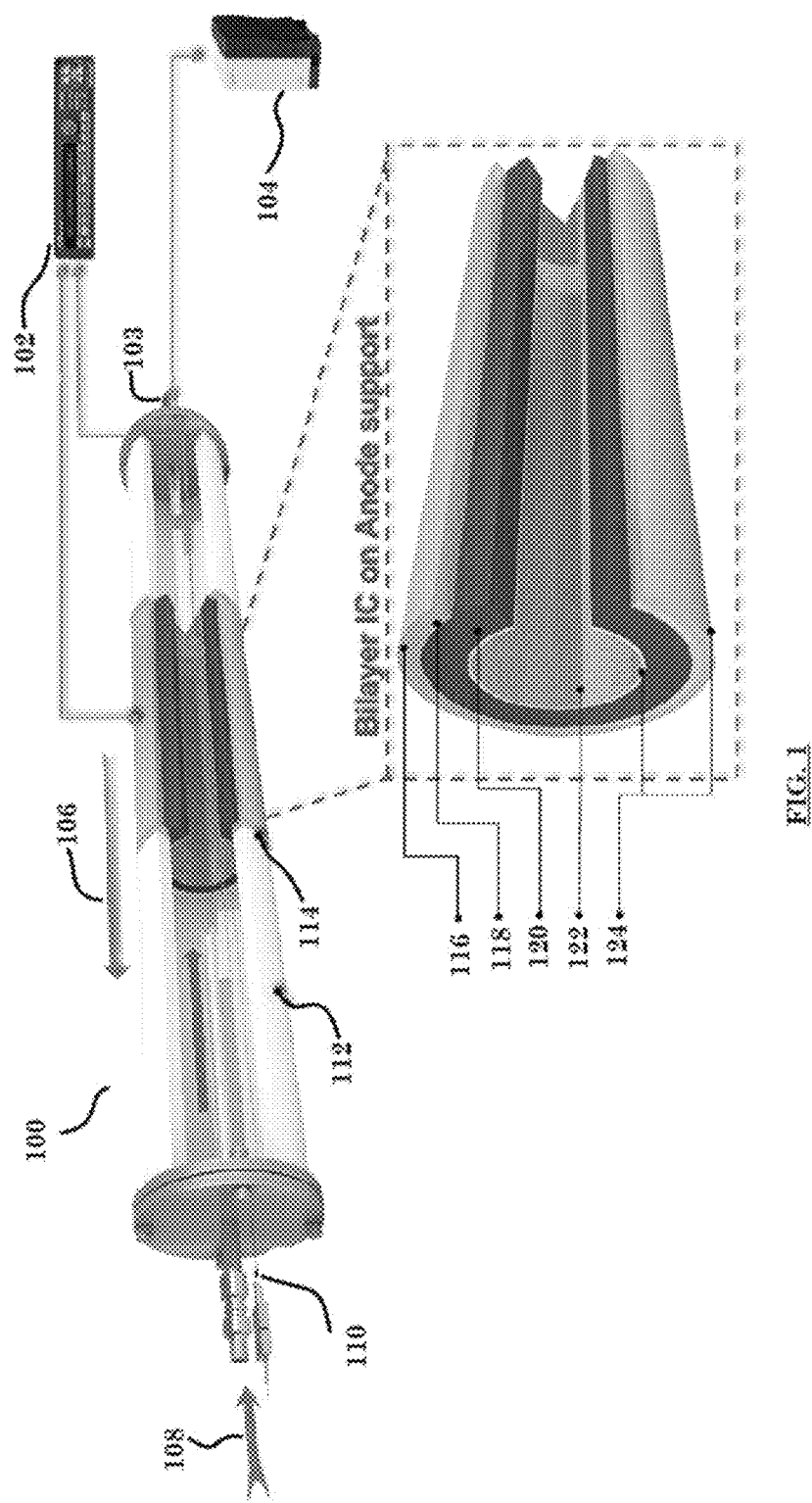
FIG. 1 shows a schematic of experimental setup of ASR and oxygen permeation of Ni-YSZ anode.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', 'less than y', and 'less than z'. Likewise, the phrase 'about x, y, z, or greater' should be interpreted to include the specific ranges of 'about x', 'about y', and 'about z' as well as the ranges of 'greater than x', 'greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure provides Cr-free, Y- and Nb-doped SrTiO3−δ (Sr1−xYxTi1−yNbyO3−δ, SYTN, 0≤x, y≤0.1) as a new ceramic IC. The results show that SYTN (Y0.08Nb0.02) is the best composition as an IC as it exhibits high electrical conductivity and can be co-sintered with Ni-YSZ anode substrate into a dense microstructure without invoking chemical reactions. A first-principles theoretical study reveals that Y- and Nb-doping transforms semiconducting $SrTiO_3$ into iterant large-polarons metal, confirming the high electrical conductivity. A bilayer IC consisting of La0.8Sr0.2MnO3−δ (LSM) top-layer and SYTN (Y0.08Nb0.02) under-layer on the anode substrate is also demonstrated with dense microstructure, low area specific resistance and negligible oxygen permeability. Overall, the bilayer ceramic IC is a strong candidate for next-generation durable, and low-cost tubular SOFCs.

The bilayer ceramic interconnect has a higher electrical conductivity, is easier to manufacture, stable over long period of operation, and provides a cost savings. Current $LaCrO_3$-based ceramic interconnects (ICs) employed in tubular solid oxide fuel cells (SOFCs) face challenges in manufacturability, durability, and cost, primarily due to Cr volatilization issues. Development of Cr-free, easy-to-manufacture and low-cost ceramic ICs are, therefore, highly desirable for tubular SOFCs.

To solve the above issues and lower the manufacturing cost, developing Cr-free ceramic IC that can be co-sintered with electrode substrate and electrolyte is deemed critical to the success of tubular SOFCs. One candidate of such a Cr-free IC material is doped $SrTiO_3$. Pure $SrTiO_3$ (STO) exhibits a high electrical conductivity in reducing atmospheres. However, reduction of $Ti^{4+}$ to $Ti^{3+}$ in reducing atmospheres creates oxygen vacancies in pure $SrTiO_3$, resulting in nonnegligible oxygen permeability. In addition, STO becomes an insulator in oxidizing atmospheres (e.g. ~$10^{-3}$ S cm$^{-1}$ at 850° C.), thus causing high ohmic resistance. Fortunately, prior studies have shown that by a proper selection of dopant on $SrTiO_3$, the resultant electrical conductivity in both reducing and oxidizing atmospheres can be appreciably improved, while the oxygen permeability is suppressed. See, Park, B.-K.; Lee, J.-W.; Lee, S.-B.; Lim, T.-H.; Park, S.-J.; Song, R.-H.; Im, W. B.; Shin, D.-R., *La-doped $SrTiO_3$ interconnect materials for anode-supported flat-tubular solid oxide fuel cells*. International Journal Of Hydrogen Energy 2012, 37 (5), 4319-4327; Horikiri, F.; Han, L.; Iizawa, N.; Sato, K.; Yashiro, K.; Kawada, T.; Mizusaki, J., *Electrical properties of Nb-doped $SrTiO_3$ ceramics with excess $TiO_2$ for SOFC anodes and interconnects*. Journal of The Electrochemical Society 2007, 155 (1), B16; Blennow, P.; Hansen, K. K.; Wallenberg, L. R.; Mogensen, M., *Electrochemical characterization and redox behavior of Nb-doped $SrTiO_3$*. Solid State Ionics 2009, 180 (1), 63-70; and Mori, M.; Wang, Z.; Serizawa, N.; Itoh, T., *Evaluation of $SrTi_{1-x}Co_xO_3$ Perovskites (0≤x≤0.2) as Interconnect Materials for Solid Oxide Fuel Cells*. Journal of Fuel Cell Science and Technology 2011, 8 (5). The key is to control the oxidation state of the dopant to be higher than those of $Sr^{2+}$ and $Ti^{4+}$, viz. donor doping.

Here, Y and Nb are chosen as the dopants to partially substitute the Sr and Ti, respectively, i.e. Sr1−xYxTi1−yNbyO3 (hereinafter denoted as SYTN), x≤0.1, y≤0.1, and the latter is studied as the IC material. The phase structure, electrical conductivity, sintering behavior, area specific resistance (ASR) and oxygen permeability are investigated over a broad range of partial pressure of oxygen. In order to circumvent the low electrical conductivity problem in oxidizing atmospheres, a bilayer IC structure consisting of a La0.8Sr0.2MnO3 (LSM) top-layer (facing air) and SYTN (Y0.08Nb0.02) under-layer on top of an anode support is fabricated by dip-coating deposition and one-step co-sintering. The sintered multilayer structure is then characterized by SEM/EDX, effective conductivity, ASR and oxygen permeability measurements under oxidizing and reducing dual atmosphere. A theoretical DFT calculation has also been carried out to support the rationale of doping Y and Nb on the Sr and Ti sites in SrTiO3, respectively.

Experimental Procedure

Material Synthesis and Structural Characterization

The Sr1−xYxTi1−yNbyO3−δ (x=0, 0.05, 0.08, 0.10; y=0, 0.01, 0.02, 0.03, 0.05, 0.10) powders were prepared via a solid-state reaction method. Stoichiometry amounts of SrCO3 (99.9%, Aldrich), Y2O3 (99.9%, Alfa Aesar), TiO2 (99.4%, Alfa Aesar) and Nb2O5 (99.9%, Alfa Aesar) were ball-milled in ethanol for 3 h at 400 r min$^{-1}$. The mixed powders were then dried, pressed into pellets and calcined at 1300° C. for 10 h in air or 5% H2/N2; these samples are denoted as air-SYTN and 5% H2/N2-SYTN, respectively. The calcined pellets were then crushed, ball-milled, pelletized, calcined at 1300° C. for 10 h; this process was repeated 3 times until it achieves a pure phase. The phase of SYTN was examined by X-ray diffractometer (XRD, Rigaku D/Max-2100, Cu Kα radiation) over a scanning range of 10~90° in a step of 0.015° at a scanning rate of 1° min$^{-1}$. The obtained XRD patterns were finally analyzed by Rietveld refinement.

Electrical Conductivity Measurement

The as-prepared SYTN powders were pressed into rectangular bars and then sintered in air or 5% $H_2/N_2$ for 10 h at 1500° C. to achieve a dense body. The electrical conductivity of the dense SYTN samples was measured in 300~800° C. with a four-probe method using a Solartron SI 1287 Electrochemical Interface. Silver wires with Pt paste were used as the four probes and contacts, respectively. The low pO$_2$ range for electrical conductivity measurements was realized by passing 5% $H_2/N_2$ through a bubbler set at different temperatures.

Fabrication of IC Thin Films on Porous Anode Substrate

The single layer and bilayer IC thin films were prepared on a porous YSZ-NiO anode substrate (Atrex Energy, Inc.) by slurry clip-coating method. To prepare the slurry, a mixture of SYTN($Y_{0.08}Nb_{0.02}$) powder (or LSM powder) and proper amount of isopropanol alcohol, polyvinyl butyral (PVB), triethanolamine (TEA) and polyethylene glycol (PEG) were blended via ball-milling. The made SYTN ($Y_{0.08}Nb_{0.02}$) slurry was first dip-coated onto the external surface of the porous anode substrate and dried in an oven at 100° C. for 1 h, followed by dipping coating the LSM slurry onto the surface of the SYTN layer and drying in an oven at 100° C. for 1 h. The multilayer ceramic structure was finally sintered in air at 1420° C. for 24 h.

Area Specific Resistance and Oxygen Permeability Measurements

The area specific resistance (ASR) and oxygen permeability evaluations of the fabricated single (SYTN ($Y_{0.08}Nb_{0.02}$)) or bilayer (LSM/SYTN($Y_{0.08}Nb_{0.02}$)) IC thin film were performed together with the anode substrate. To do so, a segment of Atrex porous NiO-YSZ tube in outer diameter of 1.13" and wall thickness of $\frac{1}{16}$" was used as the anode support. Pt wires/meshes were then attached to the inner surface of the tubular anode substrate and the outer IC surface, respectively, by Pt paste to act as the current collector, followed by heat-treatment at 600° C. for 2 h. The two ends of the tubular anode substrate were then sealed onto Al$_2$O$_3$ tubes with a glass seal. The anode side was fed with 5% H$_2$/N$_2$ and the IC side was exposed to ambient air.

The ASR of the multilayer structure was measured with the Solartron 1287 electrochemical interface, while the effluent from the anode side was analyzed by a gas chromatograph (GC, Agilent Technologies 490 Micro GC) to determine oxygen permeability. The experimental setup for EIS measurement and oxygen permeability is schematically illustrated in FIG. 1. shows a schematic of experimental setup 100 of ASR and oxygen permeation of Ni-YSZ anode with bi-layered IC. As FIG. 1 shows, setup 100 may include a potentiostat 102, gas outlet 103, gas chromatograph 104, airflow 106, H$_2$ or 5% H$_2$/N$_2$ flow 108, thermocouple 110, ceramic tube 112, glass seal 114, with the expanded view showing the bilayer IC on an Anode support comprising LSM 116, SYTN 118, Ni+YSZ Support 120, Nickle foam 122, and current collectors 124.

Chemical Stability

The chemical compatibility within the multilayer structure was first studied by firing a mixture of NiO-YSZ and SYTN powders (at a mass ratio of 1:1) at 1420° C. in air for 24 h or at 1000° C. in 5% H$_2$/N$_2$ for 24 h, followed by analyzing phases of the mixed powders by XRD. The second experiment was to check the chemical compatibility between LSM and SYTN, in which a mixture of SYTN (Y$_{0.08}$Nb$_{0.02}$) and LSM powders (at a mass ratio of 1:1) was fired at 1420° C. in air for 24 h, followed by XRD examination.

Other Characterization

The thermal expansion coefficient (TEC) and sintering curve were measured by a thermal dilatometer (Netzsch DIL 420 PC/4) to help understand the co-sintering behaviors. In addition, X-ray photoelectron spectroscopy (XPS, PerkinElmer PHI 1600 ESCA spectrometry) was employed to examine oxidation state of species in SYTN(Y$_{0.08}$Nb$_{0.02}$). During the peak splitting process, the peak positions were restricted to be identical between two spin orbits. The area ratio for 2p$_{1/2}$:2p$_{3/2}$ and 3d$_{3/2}$:3d$_{5/2}$ were constrained to 1:2 and 2:3, respectively. The microstructures of the multilayer were captured by a field emission scanning electron microscopy (FESEM, Zeiss Ultra Plus).

First-Principles Calculations

First-principles calculations were performed using Vienna ab-initio Simulation Packages (VASP), see Kresse, G.; Furthmüller, J., *Efficient iterative schemes for ab initio total-energy calculations using a plane-wave basis set*. Physical review B 1996, 54 (16), 11169. Exchange correlation functional with generalized gradient approximation parameterized by Perdew, Burke and Ernzerholf were adopted, see Perdew, J. P.; Burke, K.; Ernzerhof, M., *Generalized gradient approximation made simple*. Physical review letters 1996, 77 (18), 3865. Calculations were carried out using 2×2×3 Monkhorst-Pack k-points, see Monkhorst, H. J.; Pack, J. D., *Special points for Brillouin-zone integrations*. Physical review B 1976, 13 (12), 5188, as well as 520 eV energy cutoff. To best approach the experimental doping level, a 4×4×3 cubic supercell was constructed with 4 Y and/or 1 Nb doped on Sr and Ti site, respectively. To account for the strong-correlation in Ti 3d and Nb 4d orbitals, Hubbard U parameter was applied, with values of 4.36 eV, see Pavarini, E.; Biermann, S.; Poteryaev, A.; Lichtenstein, A.; Georges, A.; Andersen, O., *Mott transition and suppression of orbital fluctuations in orthorhombic 3 d 1 perovskites*. Physical review letters 2004, 92 (17), 176403, and 1.5 eV, see Hautier, G.; Ong, S. P.; Jain, A.; Moore, C. J.; Ceder, G., *Accuracy of density functional theory in predicting formation energies of ternary oxides from binary oxides and its implication on phase stability*. Physical Review B 2012, 85 (15), 155208, respectively.

Results and Discussion

Y and Nb Doping Boundaries

Figure 3:
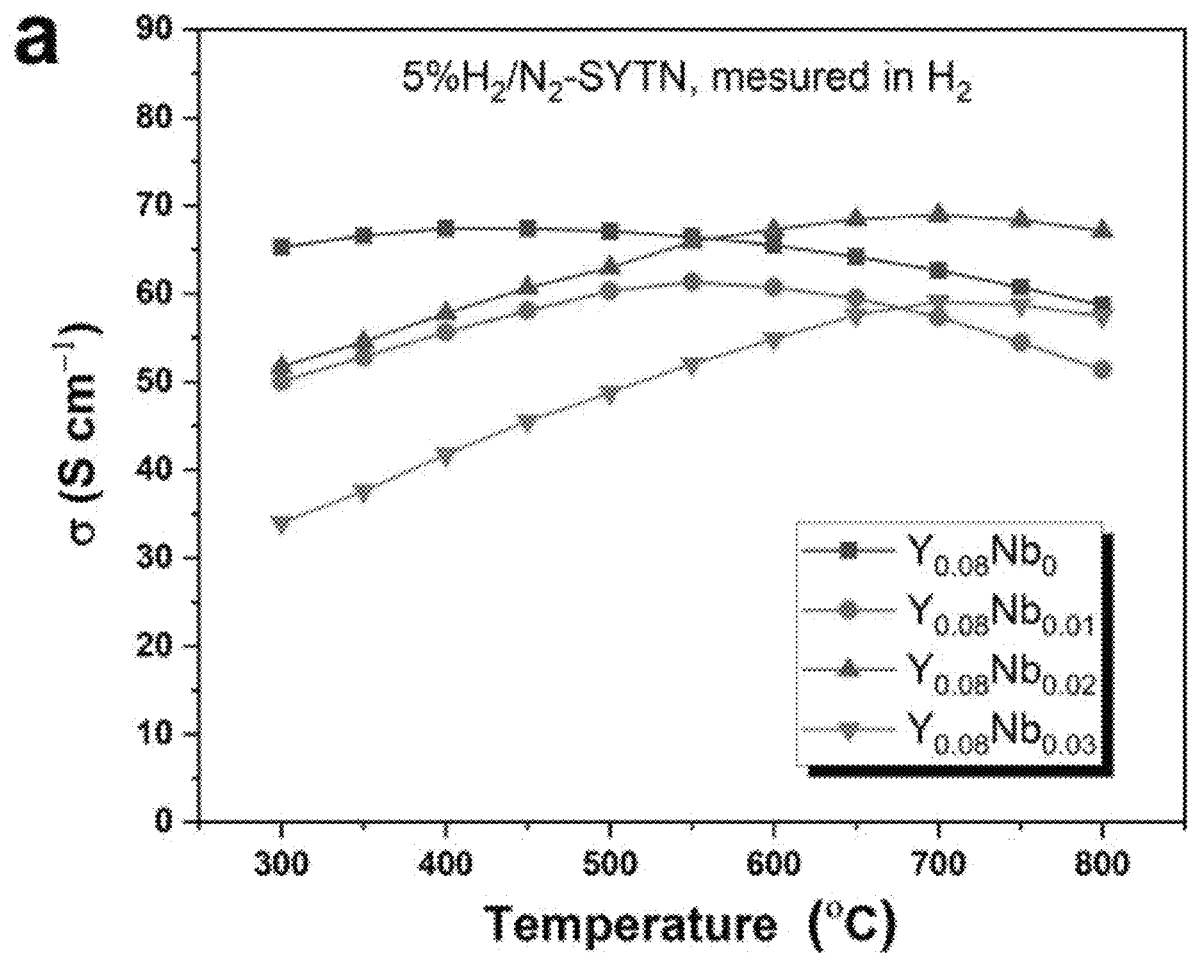
FIG. 3 shows the electrical conductivity at: (a) 5% $H_2/N_2$-SYTN series vs. temperature measured in $H_2$, (b) the conductivity of air-SYTN series measured in air; (c) electrical conductivity of air-SYTN series vs. oxygen partial pressure; and (d) the electrical conductivity of air-SYTN series vs. temperature measured in air.
Figure 3:
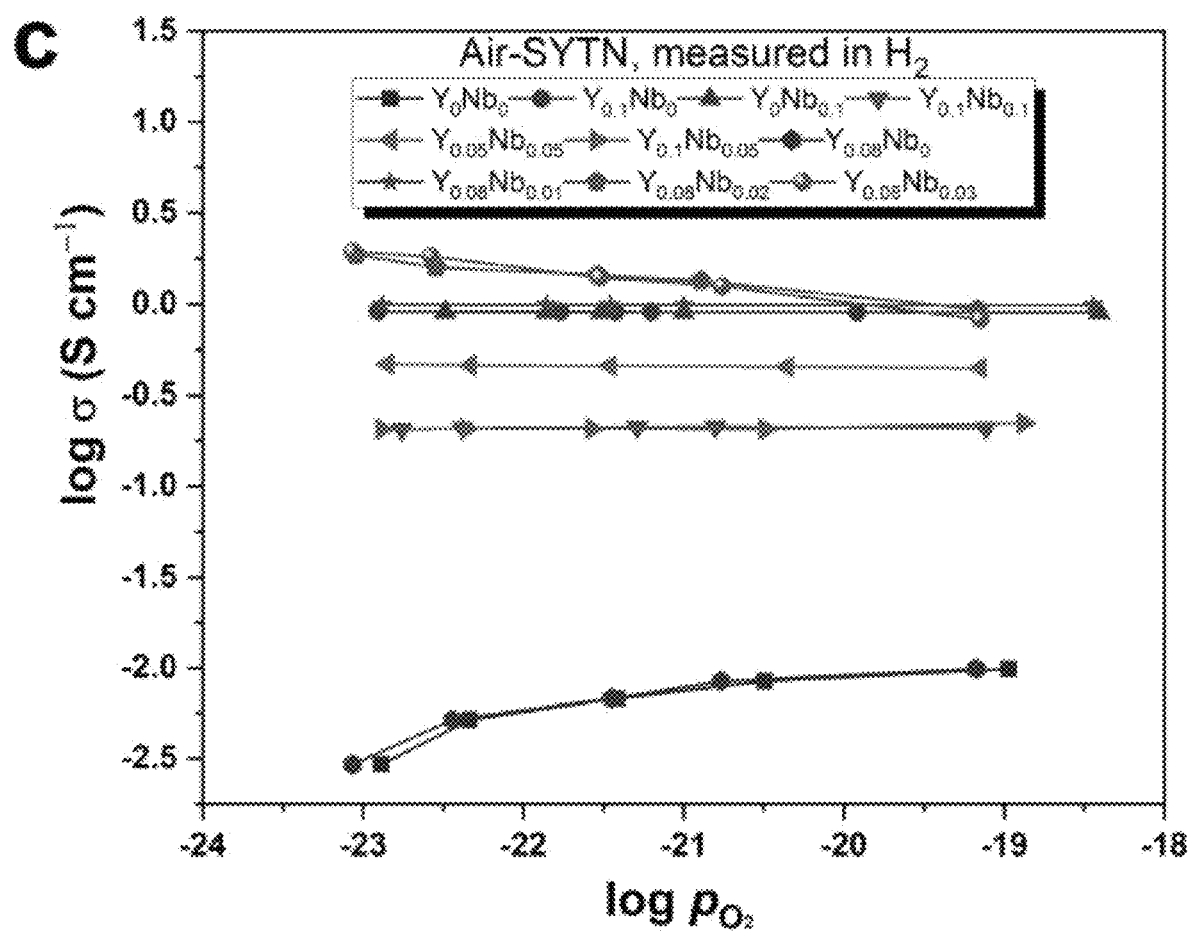
Figure 10:
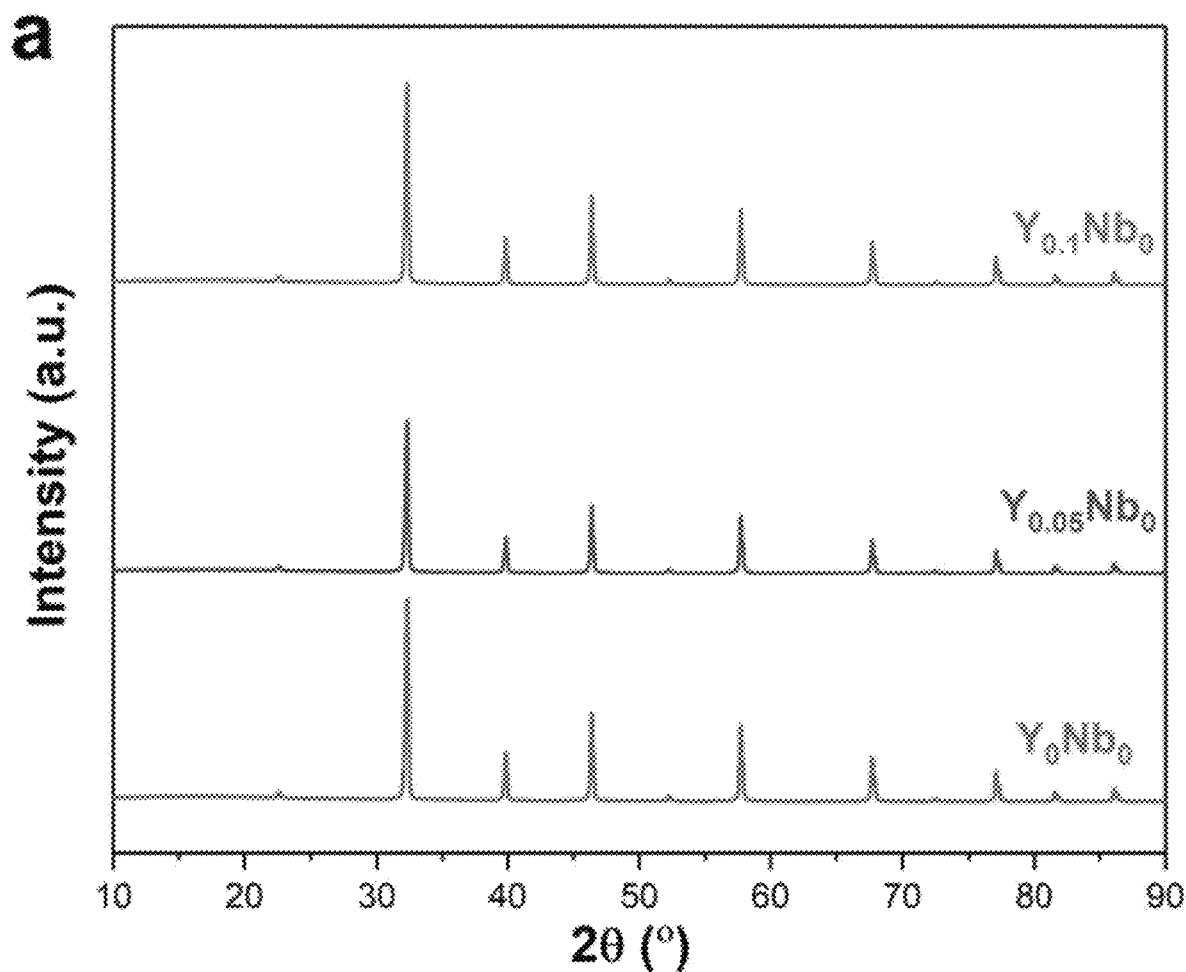
FIG. 10 shows XRD patterns of SYTN series with different contents of Y and Nb calcined at 1300° C. for 10 h in air at: (a) single Y doping; (b) Y and Nb co-doping.

The Y and Nb doping boundaries, within which a single-phase perovskite structure is formed, were mapped out by XRD examinations of Sr1−xYxTi1−yNbyO3−δ (x=0, 0.05, 0.08, 0.10; y=0, 0.01, 0.02, 0.03, 0.05, 0.10). The results are shown in FIG. 10, which shows XRD patterns of SYTN series with different contents of Y and Nb calcined at 1300° C. for 10 h in air. (a) Single Y doping; (b) Y and Nb co-doping, where suggest that Sr1−xYxTiO3 (x≤0.1) possess a single perovskite phase. However, Y$_2$Ti$_2$O$_7$ impurity appears as soon as Nb is added, indicating the difficulty of doping Nb into the Ti-lattice; the more the Nb-doping the more the Y$_2$Ti$_2$O$_7$ impurity. It is interesting to note from FIG. 11, which shows XRD patterns of SYTN series (x=0.08, 0.01≤y≤0.04) prepared in air (a) and in 5% H$_2$/N$_2$ (b), that Sr1−xYxTi1−yNbyO3−δ (all x, y<0.03) becomes a single phase after firing in 5% H$_2$/N$_2$ at 1300° C. for 10 h. In Sr1−xYxTiO3−δ compositions, Sr0.92Y0.08TiO3−δ (SYTN(Y0.08Nb0)) has been previously reported with the highest electrical conductivity in H2, see Zhao, H.; Gao, F.; Li, X.; Zhang, C.; Zhao, Y., *Electrical properties of yttrium doped strontium titanate with A-site deficiency as potential anode materials for solid oxide fuel cells*. Solid State Ionics 2009, 180 (2-3), 193-197 and Hui, S.; Petric, A., *Electrical properties of yttrium-doped strontium titanate under reducing conditions*. Journal of the Electrochemical Society 2001, 149 (1), J1. FIG. 3 at a shows that additional Nb doping (y=0.02) on the Ti-site can further enhance the electrical conductivity in H$_2$. Thus, single-phase SYTN (Y0.08Nb0.02) is selected for further investigation. FIG. 3 shows (a) The electrical conductivity of 5% H2/N2-SYTN series vs. temperature measured in H2 (b) The conductivity of air-SYTN series measured in air. (c) electrical conductivity of air-SYTN series vs. oxygen partial pressure. (d) The electrical conductivity of air-SYTN series vs. temperature measured in air.

In the undoped SrTiO$_3$, the oxidation state of Sr and Ti are bivalent and tetravalent, respectively. Donor doping on both Sr- and Ti-sites is available to enhance electron conductivity. To ensure single-phase composition, the doping content of both Y (x) and Nb (y) are chosen to be ≤0.1. A series of SYTN compositions were first calcined at 1300° C. for 10 h in air. FIG. 10 at a shows that single Y-doped SrTiO$_3$ with x=0.05 and 0.1 remains single phase and no impurity phases are observed. However, the doping of Nb on the Ti-site seems to be more difficult than Y-doping on the Si-site. Various amounts of Y$_2$Ti$_2$O$_7$ impurity was observed in all samples with Nb doping, see FIG. 10 at b. Moreover, the impurity content increases with Y/Nb doping Partial substitution of Sr$^{2+}$ with Y$^{3+}$ in oxidizing atmosphere has resulted in impurity phases. As the doping level of Y is selected to be 0.08 mol %, Nb content is restricted to be lower than 0.05 mol % in order to obtain a single-phase perovskite. However, Y$_2$Ti$_2$O$_7$ impurity is still observed in all Y and Nb co-doped SYTN samples, see FIG. 2 at a. In practical use, one side of the IC layer is facing a low oxygen partial pressure. When the powder precursors are synthesized in a reducing atmosphere, the formation of impurity is suppressed effectively, see FIG. 2 at b. Reduction of oxidation state of Ti$^{4+}$ and Nb$^{5+}$ suppresses impurity by promoting Y and Ti in Y$_2$Ti$_2$O$_7$ to dissolve back into the SYTN lattice. However, the Y$_2$Ti$_2$O$_7$ impurity in SYTN(Y$_{0.08}$Nb$_{0.03}$) powders cannot be completely removed by heat treatment in 5% $H_2/N_2$. It is noteworthy that the color of the air calcined SYTN powders is white but turns into grey after reduction.

Figure 2:
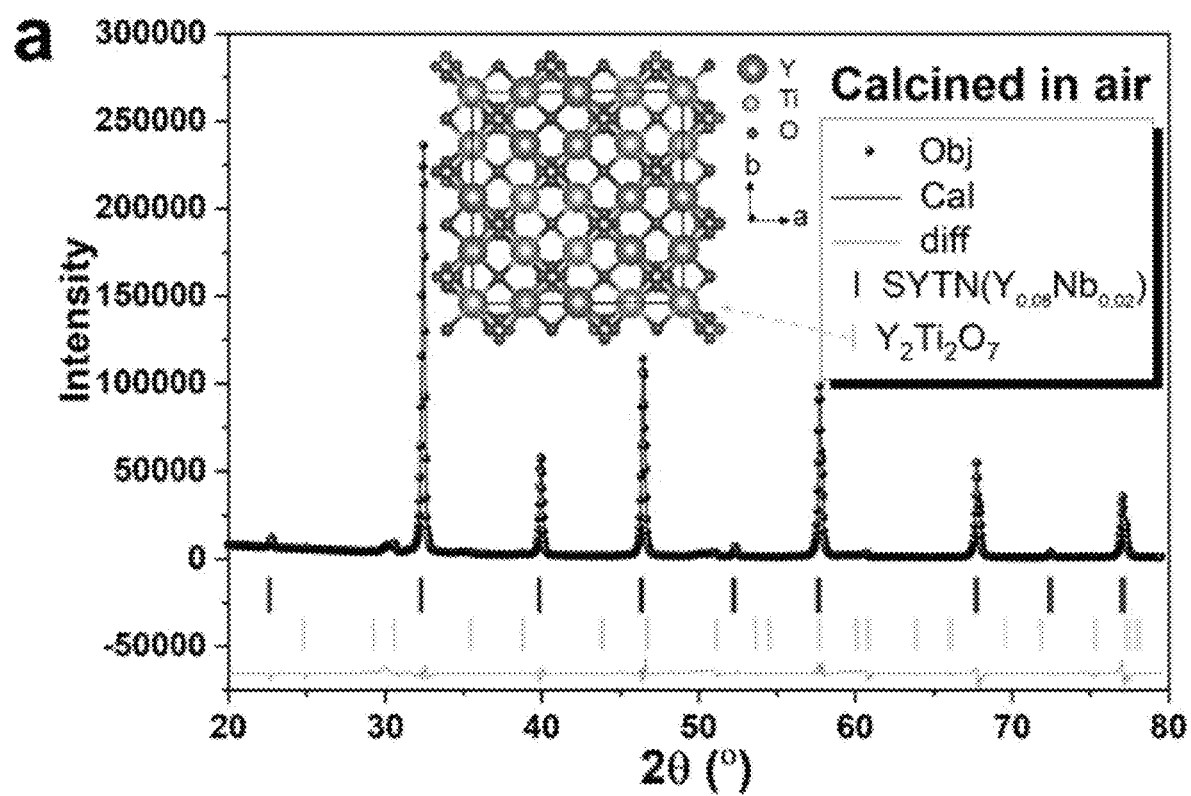
FIG. 2 shows Rietveld refinement profiles at: (a) air-SYTN(Y0.08Nb0.02); and (b) 5% H2/N2-SYTN (Y0.08Nb0.02).

The phase compositions of SYTN(Y0.08Nb0.02) sintered in both oxidizing and reducing atmospheres were further analyzed by Rietveld refinement. FIG. 2 shows that majority of SYTN($Y_{0.08}Nb_{0.02}$) has a primitive cubic structure (Pm-3m) with a minor impurity Y2Ti2O7 phase in a pyrochlore structure (Fd-3m) (inset in FIG. 2 at (a)), which is a very stable compound formed between rare-earth oxides and $TiO_2$, see Swartz, S.; Shrout, T. R., *Fabrication of perovskite lead magnesium niobate. Materials Research Bulletin* 1982, 17 (10), 1245-1250, Fox, G.; Krupanidhi, S., *Dependence of perovskite/pyrochlore phase formation on oxygen stoichiometry in PLT thin films. Journal of materials research* 1994, 9 (3), 699-711, and Li, X.; Zhao, H.; Xu, N.; Zhou, X.; Zhang, C.; Chen, N., *Electrical conduction behavior of La, Co co-doped SrTiO₃ perovskite as anode material for solid oxide fuel cells. International Journal of Hydrogen Energy* 2009, 34 (15), 6407-6414. The estimated Y2Ti2O7 content is 5.3 mol %. FIG. 2 shows Rietveld refinement profiles of (a) air-SYTN(Y0.08Nb0.02) and (b) 5% H2/N2-SYTN (Y0.08Nb0.02). Inset in (a) and (b) are the crystal structure of Y2Ti2O7 impurity and 5% H2/N2-SYTN(Y0.08Nb0.02), respectively.

Figure 11:
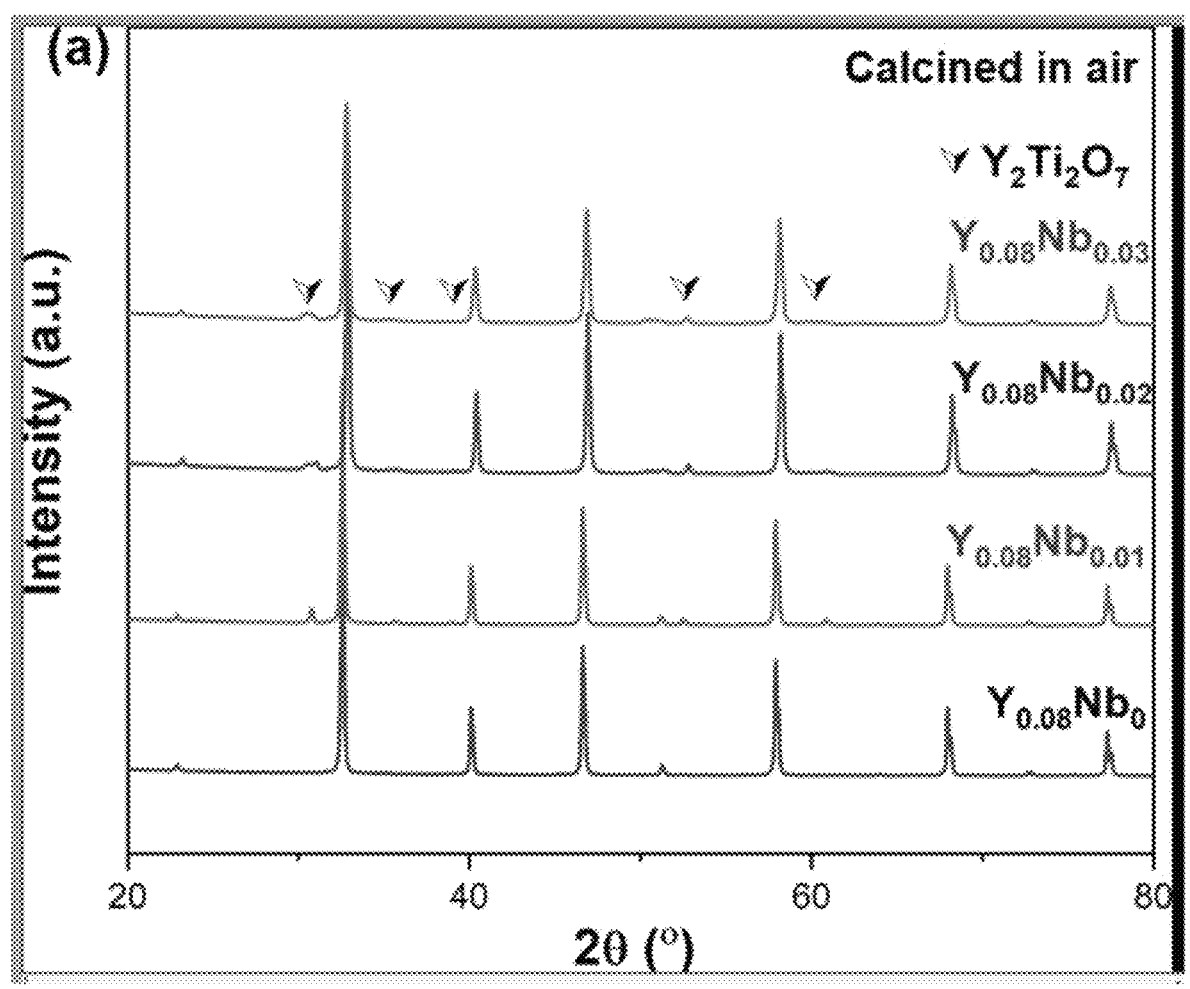
FIG. 11 shows XRD patterns of SYTN series (x=0.08, 0.01≤y≤0.04) prepared in air; at (a) and in 5% $H_2/N_2$ (b).
Figure 11:
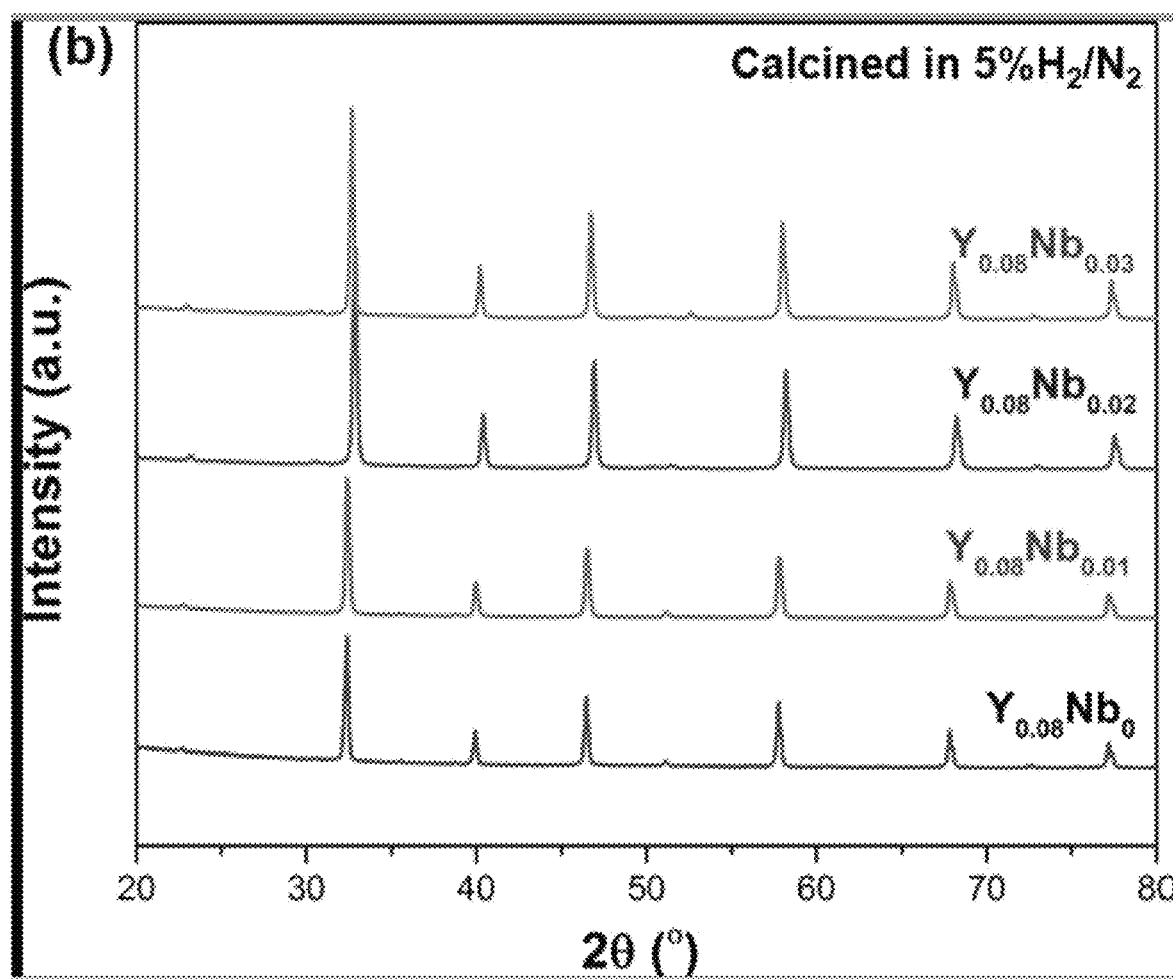
Figure 12:
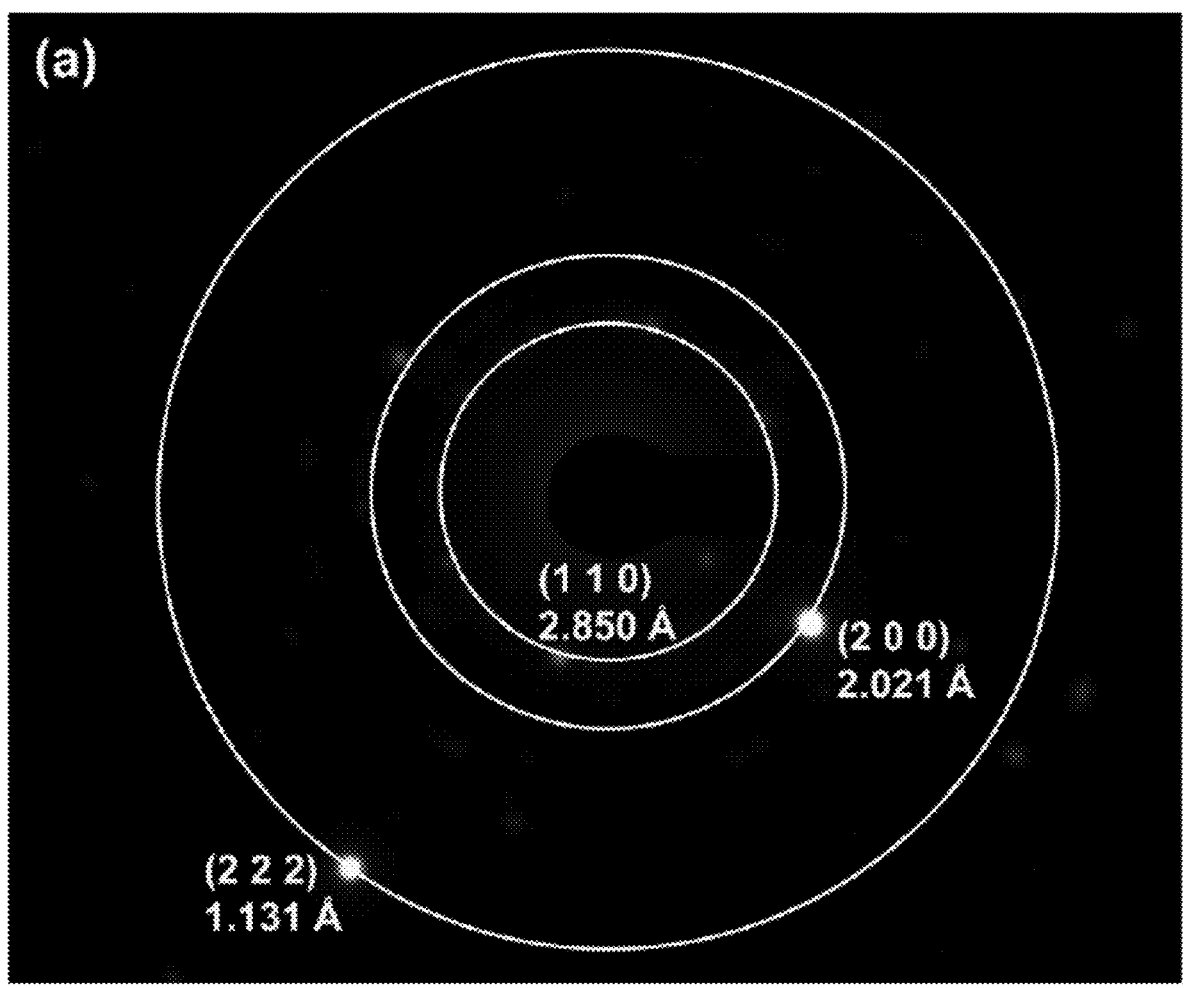
FIG. 12 shows SAED patterns of: (a) air-SYTN ($Y_{0.08}Nb_{0.02}$) and (b) 5% $H_2/N_2$-SYTN($Y_{0.08}Nb_{0.02}$).

When sintered in reducing atmosphere, SYTN (Y0.08Nb0.02) exhibit a 100% pure primitive cubic structure, see FIG. 2 at b, because $Ti^{4+}$ in Y2Ti2O7 is reduced to $Ti^{3+}$, thus destabilizing Y2Ti2O7; the final structural parameters obtained from the refinement are listed in Table S1, see FIG. 13, which shows cell expansion in reducing atmosphere observed by XRD refinement further confirm the reduction of Ti and Nb. It is important to mention that the difference in the cell volume of SYTN(Y0.08Nb0.02) upon oxidation and reduction is very small, <0.3%, which makes it an ideal IC material because chemical and thermal related stresses would be insignificant when IC is exposed simultaneously to both oxidizing and reducing atmospheres and subject to thermal cycling. The small lattice volume change upon oxidation and reduction is also confirmed by SAED indexing, see FIG. 11. FIG. 11 shows XRD patterns of SYTN series (x=0.08, 0.01≤y≤0.04) prepared in air (a) and in 5% $H_2/N_2$ (b). Partial substitution of $Sr^{2+}$ with $Y^{3+}$ in oxidizing atmosphere has resulted in impurity phases. As the doping level of Y is selected to be 0.08 mol %, Nb content is restricted to be lower than 0.05 mol % in order to obtain a single-phase perovskite. However, $Y_2Ti_2O_7$ impurity is still observed in all Y and Nb co-doped SYTN samples, see FIG. 2 at a. In practical use, one side of the IC layer is facing a low oxygen partial pressure. When the powder precursors are synthesized in a reducing atmosphere, the formation of impurity is suppressed effectively, see FIG. 2 at b. Reduction of oxidation state of $Ti^{4+}$ and $Nb^{5+}$ suppresses impurity by promoting Y and Ti in $Y_2Ti_2O_7$ to dissolve back into the SYTN lattice. However, the $Y_2Ti_2O_7$ impurity in SYTN ($Y_{0.08}Nb_{0.03}$) powders cannot be completely removed by heat treatment in 5% $H_2/N_2$. It is noteworthy that the color of the air calcined SYTN powders is white but turns into grey after reduction.

Electrical Conductivity

SYTN (x=0.08, 0≤y≤0.03) prepared in reducing environment shows a high electrical conductivity in dry $H_2$, see FIG. 3 at a. FIG. 3 shows at: (a) electrical conductivity of 5% H2/N2-SYTN series vs. temperature measured in H2; (b) conductivity of air-SYTN series measured in air; (c) electrical conductivity of air-SYTN series vs. oxygen partial pressure; and (d) electrical conductivity of air-SYTN series vs. temperature measured in air. For SYTN(Y0.08Nb0.02), it exceeds 70 S cm⁻¹ at 700° C.

In a tubular SOFC, the presence of an oxygen partial pressure (pO2) gradient across the IC layer affects its effective ASR. Therefore, it is important to evaluate the electrical conductivity of the IC material in both oxidizing and reducing atmospheres. FIG. 3 at b shows the temperature-dependent conductivity of air-SYTN series measured in pure 112. The SYTN(Y0.08Nb0.02) and SYTN (Y0.08Nb0.03) show the highest electrical conductivity among the series. However, it is an order of magnitude lower than that of 5% $H_2/N_2$-SYTN. The conductivities of air-SYTN series in the low pO2 range are shown in FIG. 3 at c, where stable conductivities are observed for all compositions, implying their excellent stability in reducing atmospheres. The SYTN(Y0.08Nb0.02) and SYTN (Y0.08Nb0.03) again show the highest electrical conductivity in FIG. 3 at c. The electrical conductivities of SYTN series in air are, however, lower than those in reducing atmospheres, comparing FIG. 3 at d with FIG. 3 at b, reflecting the n-type conducting nature of STO-based perovksites, which is consistent with FIG. 3 at c.

Overall, SYTN(Y0.08Nb0.02) and SYTN(Y0.08Nb0.03) show the highest conductivity in reducing atmosphere, meeting the electrical conductivity requirement for ceramic interconnects (≥1 S cm⁻¹). See, Zhu, W. Z.; Deevi, S., *Development of interconnect materials for solid oxide fuel cells. Materials Science and Engineering: A* 2003, 348 (1-2), 227-243. However, their lower conductivity in oxidizing atmosphere could still become an issue for practical applications.

XPS Analysis

Figure 4:
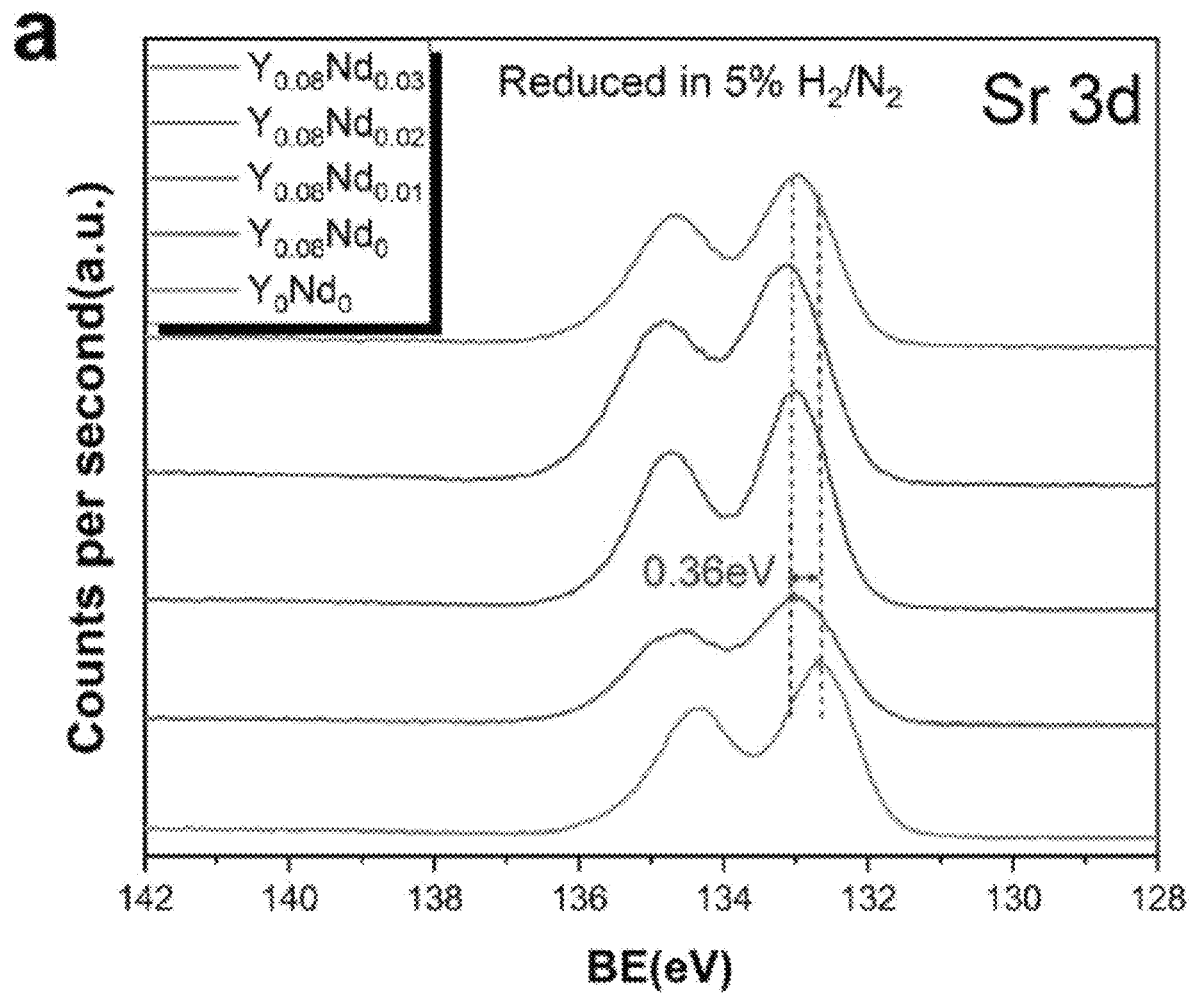
FIG. 4 shows XPS BE changes of Sr 3d (a) and Ti 2p (b) upon Y and Nb doping for the 5% $H_2/N_2$-SYTN series.

To understand the doping effects on oxidation states of cations, we carried out XPS on the SYTN series (x=0.08, 0≤y≤0.03). FIG. 4 shows XPS BE changes of Sr 3d (a) and Ti 2p (b) upon Y and Nb doping for the 5% H2/N2-SYTN series. FIG. 4 at a and b show the binding energy (BE) changes of Sr 3d and Ti 2p upon Y and Nb doping. Compared with undoped SYTN(Y0Nb0), the BE of Sr 3d in SYTN(Y0.08Nb0) is increased by 0.36 eV (from 132.675 to 133.035 eV), while the BE of Ti 2p in SYTN(Y0.08Nb0) remains unchanged. The Sr 3d BE change is caused by the Y-doping. Similarly, for Nb-doped samples with a fixed Sr-doping level, the BE of Sr 3d remains unchanged, while the Ti 2p BE is increased by 0.25 eV, reflecting the substitution of Ti by Nb.

By keeping x=0.08, the BE of Sr 3d remains unaffected by Nb doping. However, when the Nb doping is increased to 0.03, the BEs of both Sr 3d and Ti 2p show a shift to a lower value. This may be related to the excessive Nb doping, resulting in impurity Y2Ti2O7 as indicated by XRD.

Figure 5:
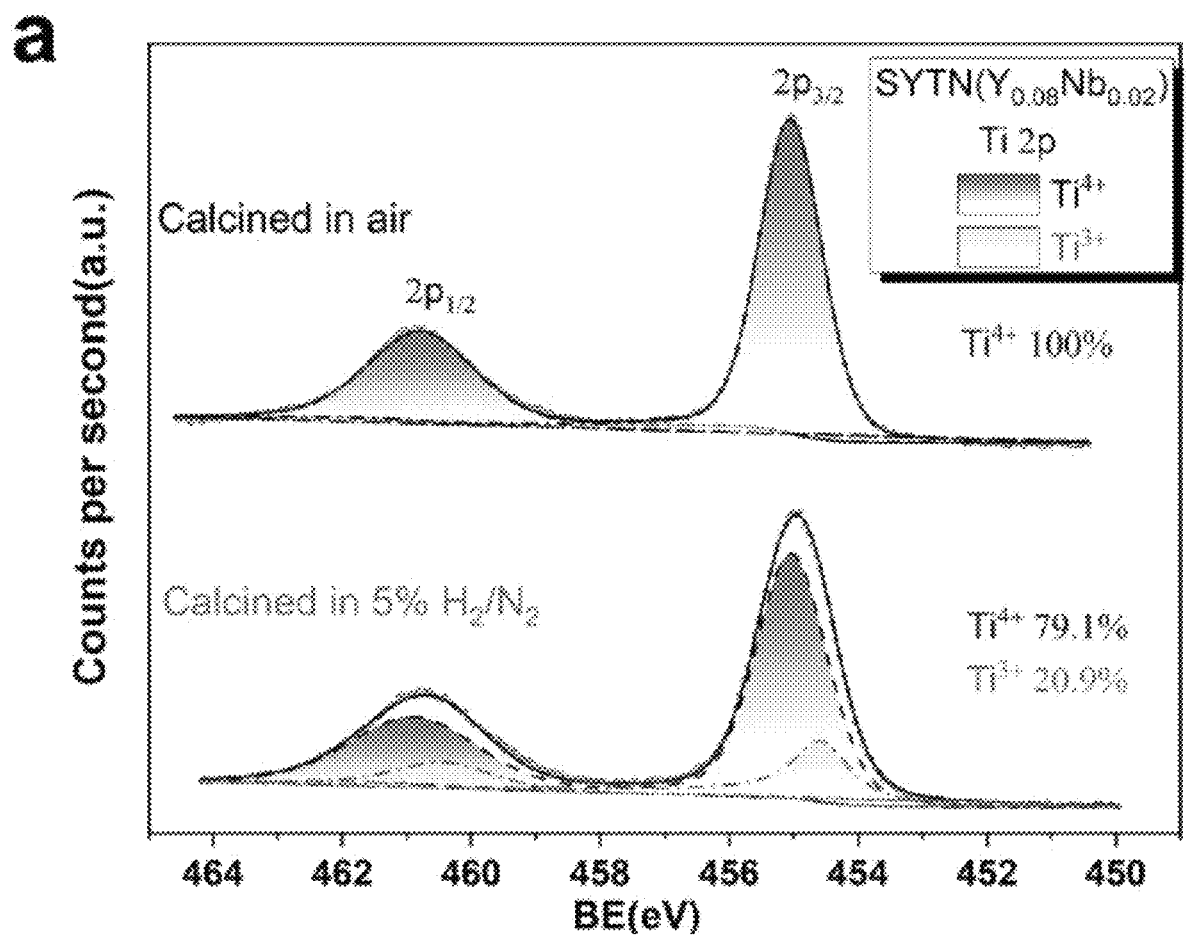
FIG. 5 shows XPS spectra of: (a) Ti 2p; and (b) Nb 3d for air-SYTN(Y0.08Nb0.02) and 5% H2/N2-SYTN (Y0.08Nb0.02).

As indicated by XRD, the Y2Ti2O7 impurity resulted from excess Y/Nb doping in SYTN(Y0.08Nb0.02) can be removed by heat treatment in reducing atmosphere. FIG. 5 shows at: (a) XPS spectra of Ti 2p; and at (b) Nb 3d for air-SYTN(Y0.08Nb0.02) and 5% H2/N2-SYTN (Y0.08Nb0.02). FIG. 5 at a and b compare the XPS spectra of Ti 2p and Nb 3d of SYTN(Y0.08Nb0.02) prepared in air and 5% $H_2/N_2$, respectively. As expected, the oxidation states of Ti and Nb in oxidizing environment are $Ti^{4+}$ and $Nb^{5+}$, respectively. After exposing to reducing environment, the Ti 2p and Nb 3d spectra deconvolute into 2 subsets, suggesting both $Ti^{4+}$ and $Nb^{5+}$ are partially reduced to $Ti^{3+}$ and $Nb^{4+}$, respectively. A comparison of the area ratio indicates that there is 87.4% of $Nb^{5+}$ reduced to $Nb^{4+}$, while only 20.9% of $Ti^{4+}$ reduced to $Ti^{3+}$. The reduced state of $Nb^{4+}$ and $Ti^{3+}$ are expected to significantly contribute to the electronic conductivity.

Sintering Behavior and TGA

Figure 6:
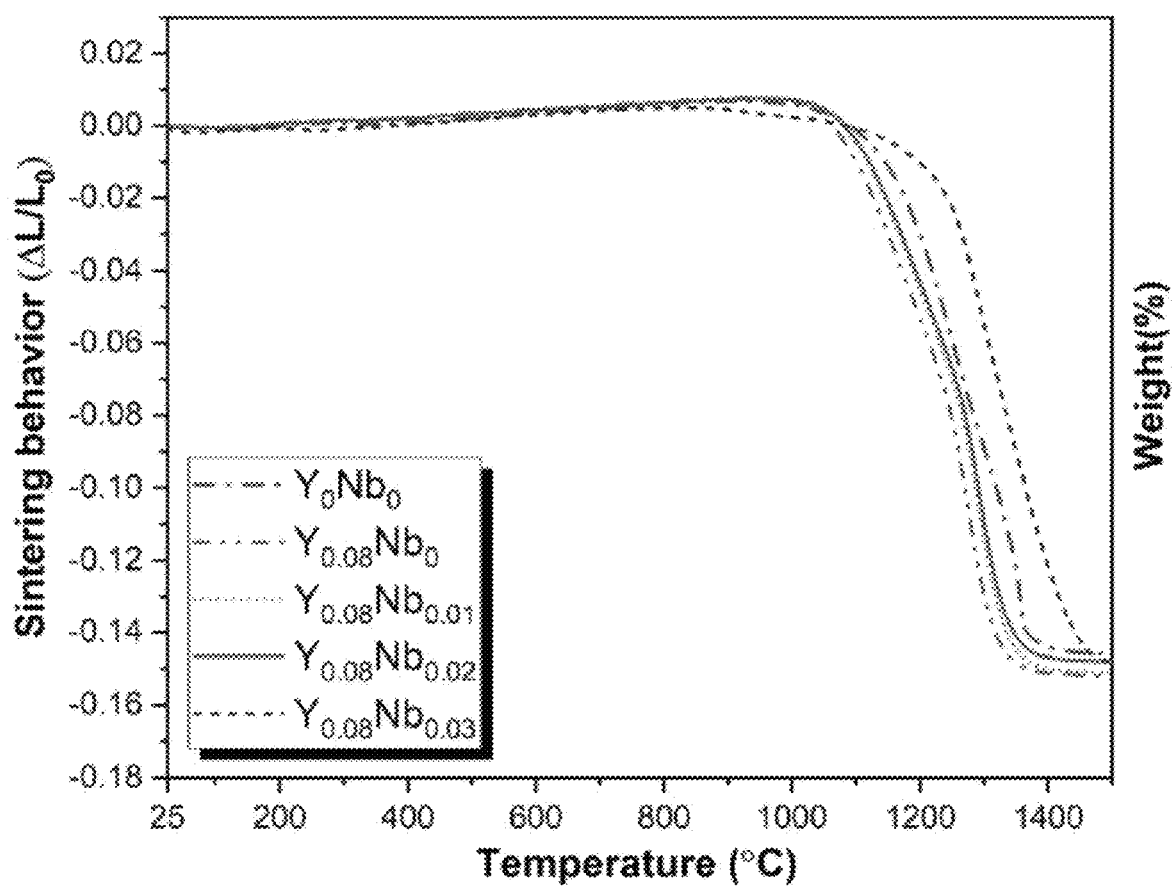
FIG. 6 shows at: (a) sintering curves of $SrTiO_3$ and SYTN (Y=0.08, Nb=0, 0.01, 0.02, 0.03) and (b) Thermogravimetry (TG) analysis of 5% H2/N2-SYTN(Y0.08Nb0.02) and undoped 5% H2/N2-STO.

The ability to densify SYTN with porous anode substrate at elevated temperatures has important implications to low-cost fabrication of ceramic IC. To know the temperatures at which the sintering starts and ends, we measured sintering curves of SYTN with TMA. FIG. 6 shows at: (a) Sintering curves of SrTiO3 and SYTN (Y=0.08, Nb=0, 0.01, 0.02, 0.03); and at (b) thermogravimetry (TG) analysis of 5% H2/N2-SYTN(Y0.08Nb0.02) and undoped 5% H2/N2-STO. FIG. 6 at a suggests that single Y-doping on Sr can lower the sintering temperature of SrTiO3 by ~50° C., while adding a small amount of Nb on Ti instead increases the sintering temperature. However, Y- and Nb-co-doped SYTN (Y=0.08, Nb=0, 0.01, 0.02) can be densified at 1300-1400° C. This temperature range matches well with the current anode sintering temperature (1420° C.), suggesting that co-sintering SYTN IC with the anode-substrate is possible. Too much Nb doping is detrimental to densification. At y=0.03, the densification temperature can be as high as ~1500° C.

One of the concerns of using ceramic IC is oxygen leakage from mixed oxygen vacancies and electron conduction under fuel cell operation conditions. FIG. 6 at b shows a comparison of the weight loss of 5% H2/N2-SYTN (Y0.08Nb0.02) and the undoped $SrTiO_3$ from RT to 1200° C. in 5% $H_2/N_2$. The weight loss under 200° C. can be attributed to the adsorbed water. The weight loss at elevated temperatures can be an indicative of oxygen loss (or oxygen vacancy content). A total weight loss of ~0.5% is observed for the undoped $SrTiO_3$, while the weight loss for the 5% H2/N2-SYTN(Y0.08Nb0.02) is much smaller and, most loss occurs at 200° C., which is related to adsorbed-water. The total high-temperature weight loss related to oxygen is <0.01%, suggesting the concentration of oxygen vacancy is very low in SYTN(Y0.08Nb0.02). From the above results, it is evident that SYTN(Y0.08Nb0.02) is the best ceramic IC composition. In the following, this composition (acronym SYTN) will be further evaluated in a practical IC working condition.

The LSM/SYTN Bilayer IC: Microstructure

Figure 14:
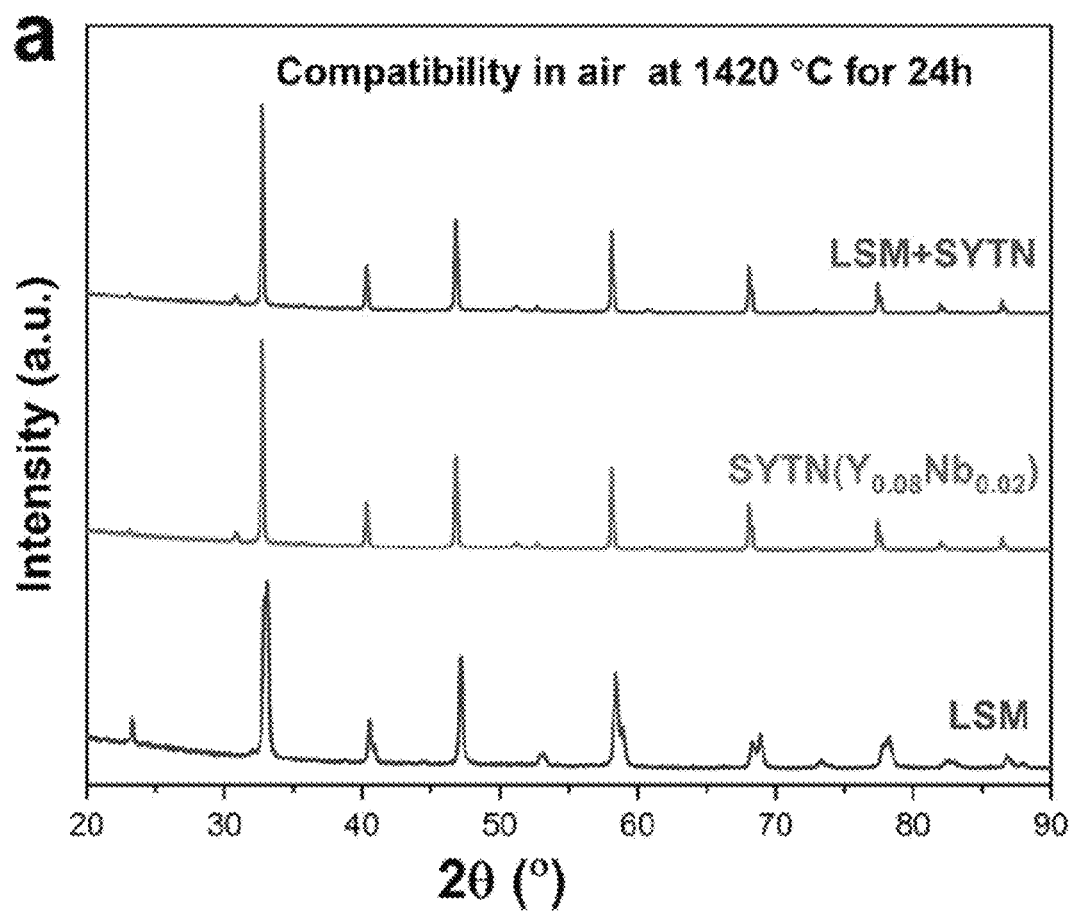
FIG. 14 shows graphs of chemical compatibility of LSM and SYTN at: (a) 1420° C. for 24 h in air and 5% $H_2/N_2$; and (b) LSM and SYTN have excellent chemical compatibility at 1420° C. within 24 h in air as well as in 5% $H_2/N_2$.
Figure 15:
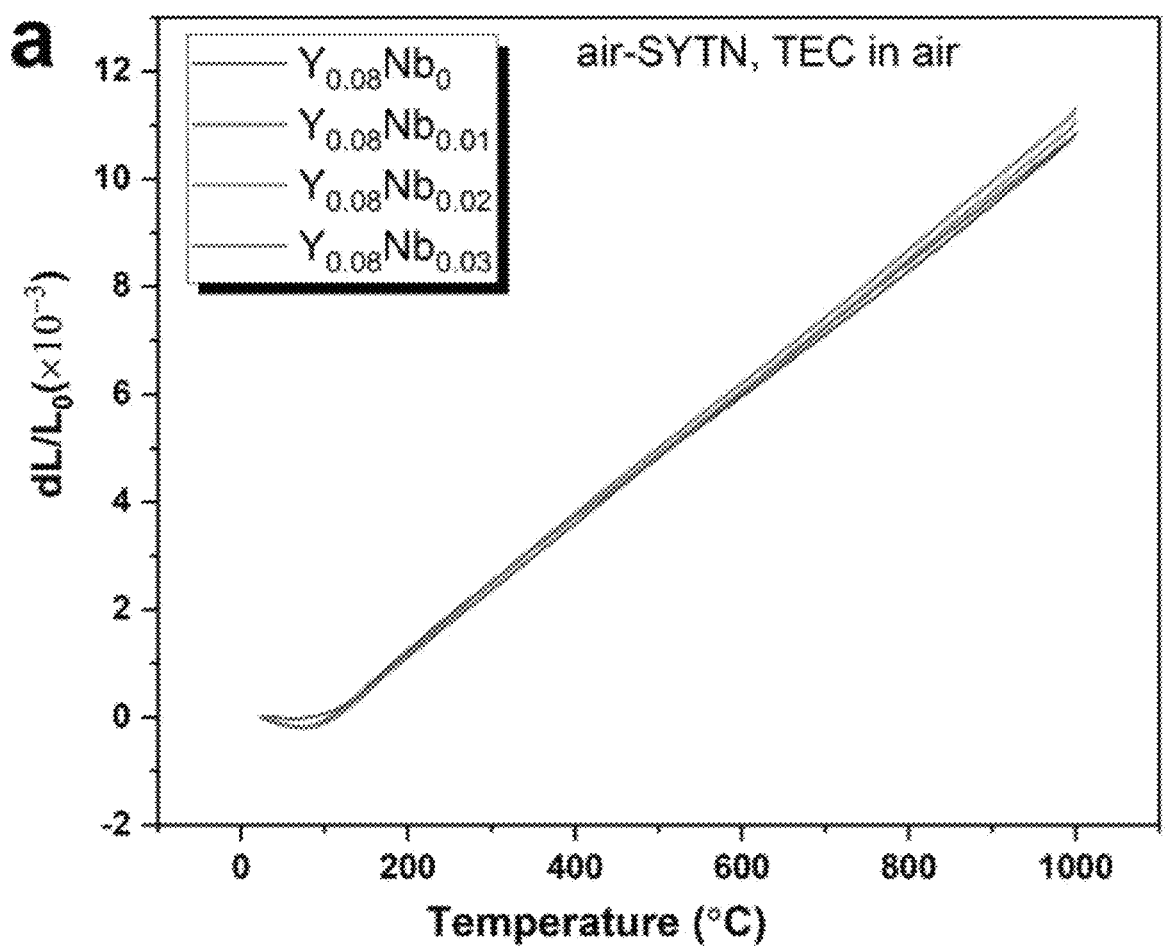
FIG. 15 shows thermal expansion curve of: (a) air-SYTN (Y=0.08, Nb=0, 0.01, 0.02, 0.03) in air; and (b) 5% $H_2/N_2$-SYTN (Y=0.08, Nb=0, 0.01, 0.02, 0.03) in 5% $H_2/N_2$.
Figure 16:
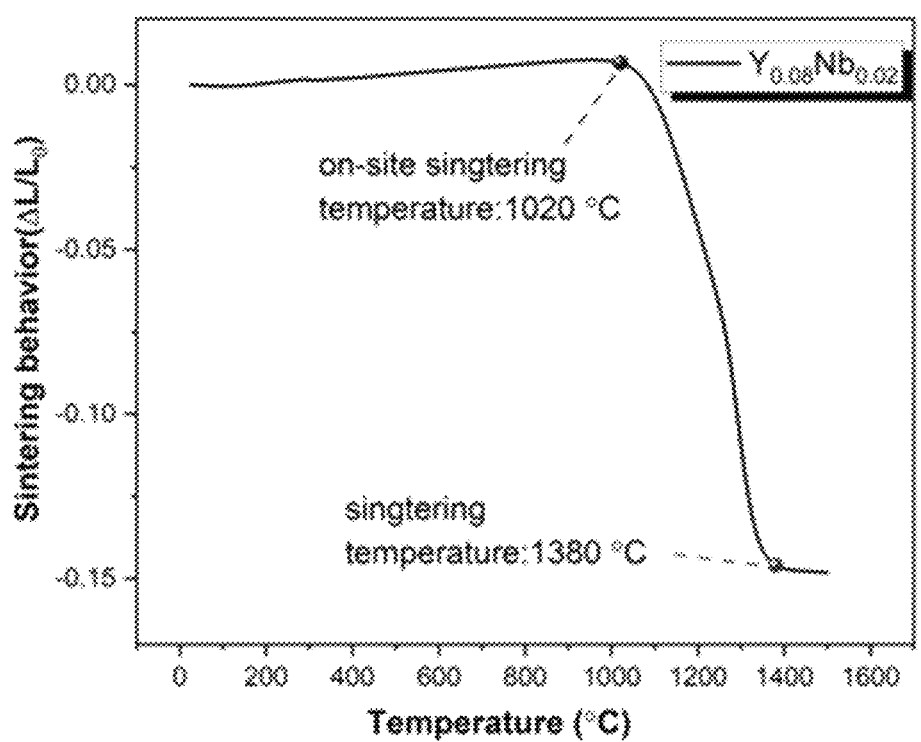
FIG. 16 shows a sintering curve of SYTN($Y_{0.08}Nb_{0.02}$).

As a typical n-type conductor, SYTN exhibits a lower electrical conductivity in oxidizing atmosphere than in reducing atmosphere. To overcome this problem for practical use, a bilayer IC comprising of a SYTN under-layer facing reducing atmosphere and an LSM top-layer facing air is here provided. The electrical conductivity of LSM is as high as 300 S $cm^{-1}$ at 900° C. See, Jiang, S. P., *A comparison of $O_2$ reduction reactions on porous (La,Sr)MnO3 and (La,Sr)(Co,Fe)O$_3$ electrodes. Solid State Ionics* 2002, 146 (1), 1-22. An excellent chemical compatibility between LSM and SYTN in both oxidizing and reducing atmospheres at 1420° C. is confirmed in FIG. 14. FIG. 14 shows at: (a) chemical compatibility of LSM and SYTN at 1420° C. for 24 h in air; and at (b) 5% $H_2/N_2$. FIG. 14 shows that LSM and SYTN have excellent chemical compatibility at 1420° C. within 24 h in air as well as in 5% $H_2/N_2$. An excellent thermal compatibility between redox-stable SYTN and LSM is also presented in FIG. 15, where the average TEC of oxidized Y- and Nb-doped SYTN within 20 to 1000° C. is in the range 11.6-12.1×$10^{-6}$/K, close to the TEC value of LSM (11.7×$10^{-6}$/° C., 23-900° C.). See, Quarez, E.; Kravchyk, K. V.; Joubert, O., *Compatibility of proton conducting $La_6WO_{12}$ electrolyte with standard cathode materials. Solid State Ionics* 2012, 216, 19-24. FIG. 15 shows Thermal expansion curve of (a) air-SYTN (Y=0.08, Nb=0, 0.01, 0.02, 0.03) in air; (b) 5% H2/N2-SYTN (Y=0.08, Nb=0, 0.01, 0.02, 0.03) in 5% $H_2/N_2$. The thermal expansion coefficient (TEC) of air-SYTN with increasing Nb contents are observed to be 11.6, 11.8, 11.9 and 12.1×$10^{-6}$/K. The TEC of 5% H2/N2-SYTN with increasing Nb contents are 11.9, 12.1, 12.2 and 12.3×$10^{-6}$/K. Reduction of Ti and Nb results in a minor increase in TEC, up to 11.9-12.3×$10^{-6}$/K, which is consistent with the slight increase in the unit cell volume, as confirmed by XRD refinement in the case of SYTN(Y0.08Nb0.02).

Figure 7:
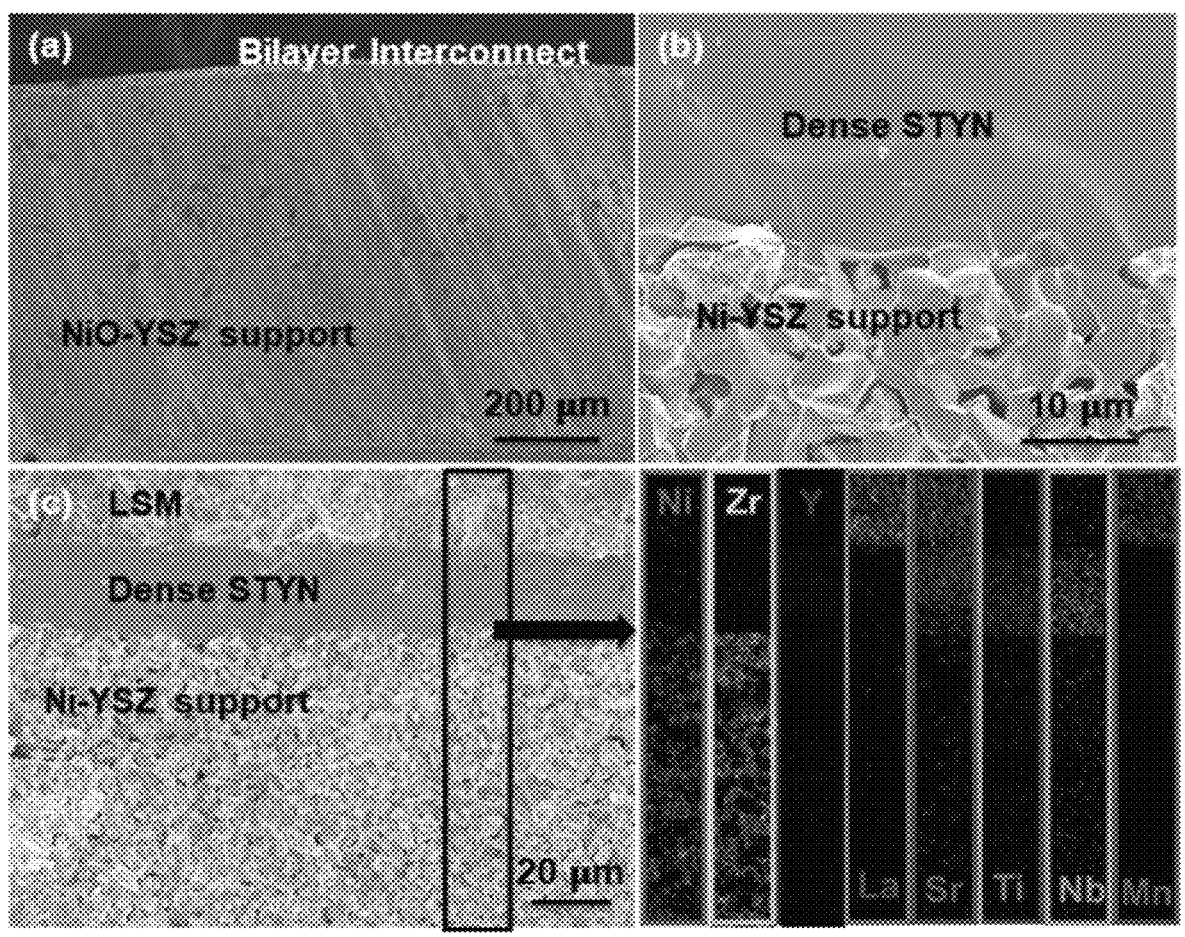
FIG. 7 shows a cross sectional SEM image of bilayer IC on a tubular anode support and at: (a) co-sintered bilayer IC/NiO-YSZ at 1420° C. for 24 h in air; (b) SYTN/Ni-YSZ interface after reduction at 1000° C. for 24 h in 5% $H_2/N_2$; (c) LSM/SYTN/Ni-YSZ interface; and (d) EDX mapping.

The microstructure of co-sintered bilayer IC/anode substrate is shown in FIG. 7. FIG. 7 shows cross sectional SEM images of bilayer IC on a tubular anode support at: (a) co-sintered bilayer IC/NiO-YSZ at 1420° C. for 24 h in air; (b) SYTN/Ni-YSZ interface after reduction at 1000° C. for 24 h in 5% H2/N2; (c) LSM/SYTN/Ni-YSZ interface; and (d) EDX mapping.

It is evident that a 40 µm-thick LSM/SYTN bilayer IC has been successfully sintered onto the NiO-YSZ support at 1420° C. in air, see FIG. 7 at a. After reduction at 1000° C. in 5% $H_2/N_2$ for 24 hours, a dense microstructure of SYTN IC layer and excellent bonding to the porous Ni-YSZ support are clearly observed in FIG. 7 at b. The dense microstructure of LSM and its strong bonding to SYTN layer are also evident in FIG. 7 at (c). The individual thickness of the bi-layer IC is 20 µm for SYTN and LSM layer, respectively. However, it is recognized that this thickness split may not be optimal to achieve the lowest ohmic ASR. Future work will focus on further optimization of relative thickness between the two layers. The compositions in each layer are further mapped out by EDX and shown in FIG. 7 at d, indicating the excellent chemical compatibility between the bilayer IC and anode substrate.

ASR and Oxygen Permeability of the SYTN/LSM Bilayer IC

The ASR of the bilayer IC play a key role in cell ohmic resistance. Theoretically speaking, the thinner the IC layer, the lower the ASR. However, too thin an IC layer may also invoke high oxygen permeability. Therefore, a proper balance in ohmic ASR and oxygen permeability is needed. We designed a special cell to characterize ASR and oxygen permeability simultaneously, see FIG. 1. In this setup, $H_2$ was supplied to inside the Ni-YSZ tube, and ASR of Ni-YSZ anode together with single layer or bilayer IC is measured with 4-probe method. FIG. 7 at b shows that the bilayer IC has a lower ASR than the single layer counterpart.

The higher ASR observed in the single layer IC resulted from the low electrical conductivity of SYTN at high pO2. Evidently, covering the SYTN layer with a p-type conducting LSM layer improves the overall ASR. The ASRs for the bilayer IC are 0.580, 0.405, 0.308, 0.178 and 0.125 $\Omega cm^2$ at 600, 650, 700, 750 and 800° C., respectively, which is higher than that for metallic interconnect (≤0.1 $\Omega cm^2$). See, Zhu, W. Z.; Deevi, S., *Opportunity of metallic interconnects for solid oxide fuel cells: a status on contact resistance. Materials Research Bulletin* 2003, 38 (6), 957-972 and Zhao, L.; Brouwer, J., *Electrical Properties of Sr0.86Y0.08TiO3 Under Redox and Full Cell Fabrication Conditions. Journal of Fuel Cell Science and Technology* 2012, 9 (5).

To further evaluate the oxygen permeability and the gas tightness of the bilayer IC, a 50 sccm of 5% $H_2$/Ar was supplied to inside the Ni-YSZ tube at a temperature range of 600-800° C., while the effluent is analyzed by an on-line GC.

Figure 8:
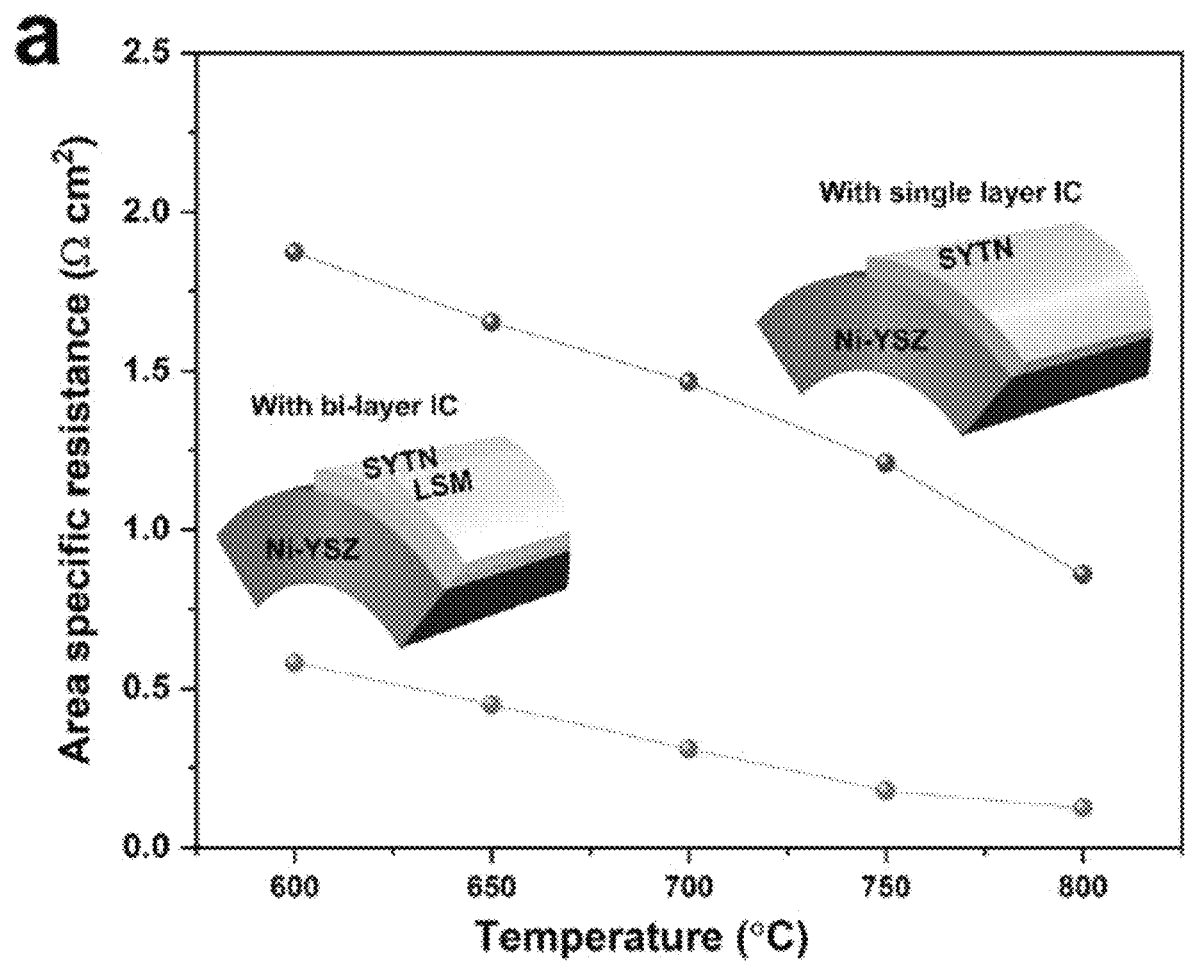
FIG. 8 shows at: (a) ASR comparison of Ni-YSZ support with single or bi-layer IC vs temperature; and (b) oxygen permeability of Ni-YSZ support with bilayer IC vs temperature.
Figure 8:
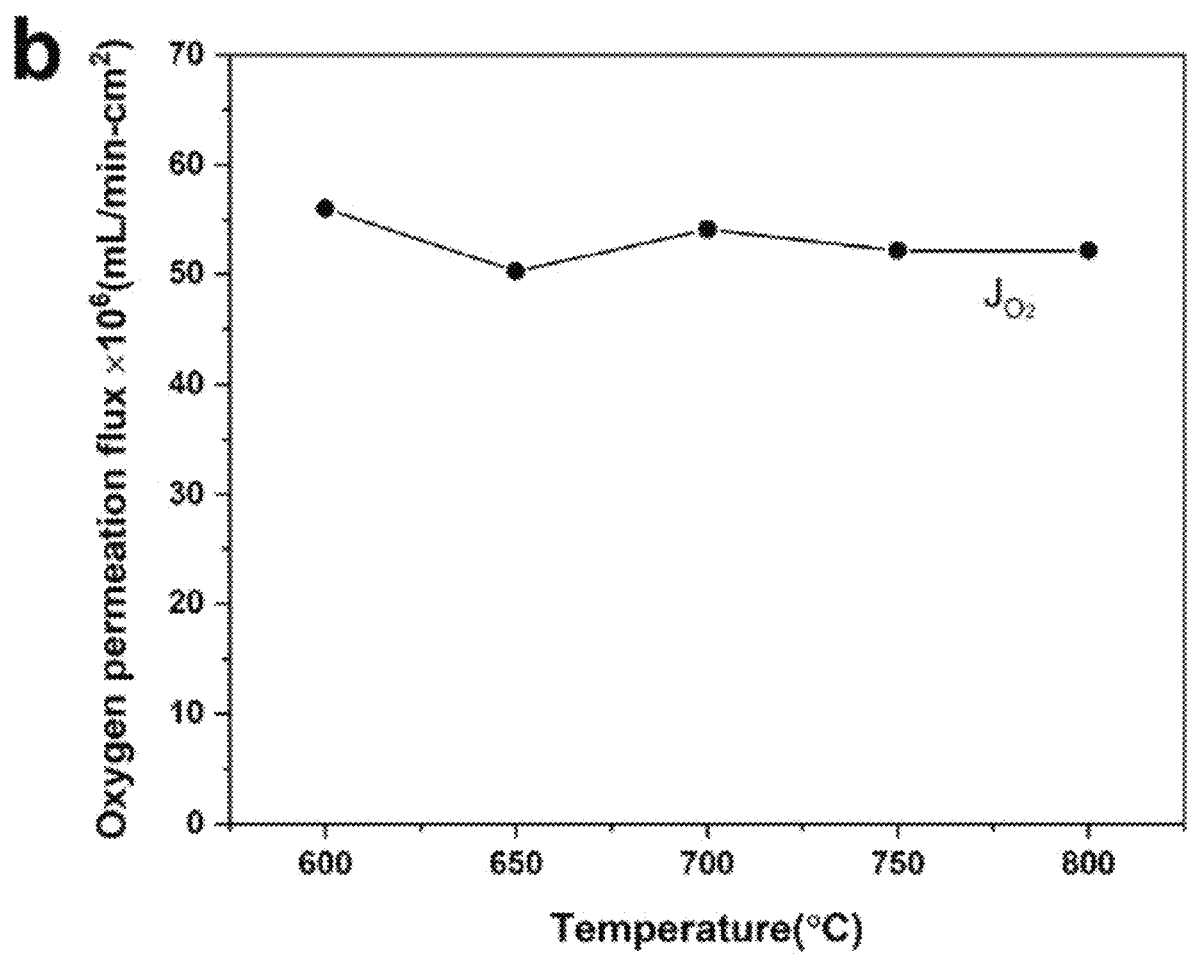

From the change in H$_2$ concentration measured, the oxygen flux, JO$_2$, can be calculated by:

$$J_{O_2} = \frac{1}{2} J_{H_2}(\text{consumed}). \quad (1)$$

where hydrogen flux, JH$_{2(consumed)}$, consumed by O$_2$ is calculated based on dry-gas concentration determined by GC:

$$J_{H_2}(\text{consumed}) = \frac{(C_{H_2}^{in} - C_{H_2}^{out}) \times F_{H_2}}{A}, \quad (2)$$

where $C_{H_2}^{in}$ and $C_{H_2}^{out}$ are the inlet and outlet concentrations of H$_2$, respectively; F$_{H2}$=25 sccm (50 sccm×5%); A is the effective surface area of IC layer. Note that oxygen permeated through the IC layer as well as leaked through physical pores/cracks (either in seals or the IC layer) can also consume hydrogen. However, the physical oxygen leakage can be corrected by N$_2$ concentration determined by GC. In this case, the detected N$_2$ concentration is <80 ppm. Therefore, the oxygen from physical leakage is negligible. It also suggests that the bilayer IC is microstructurally dense. FIG. 8 shows at: (a) ASR comparison of Ni-YSZ support with single or bi-layer IC vs temperature; and (b) oxygen permeability of Ni-YSZ support with bilayer IC vs temperature. FIG. 8 at b shows the oxygen permeation flux between 600-800° C. An extremely low and flat oxygen permeation flux is observed at different temperatures, which resulted from the very low oxygen vacancies concentration suggested by FIG. 6 at b.

Overall, the bilayer ceramic IC exhibits excellent physical and chemical compatibilities within adjacent materials, low ASR, low oxygen permeability and gas tightness, making it a promising IC choice for anode supported tubular SOFCs.

Electronic Structures of SYTN

Figure 9:
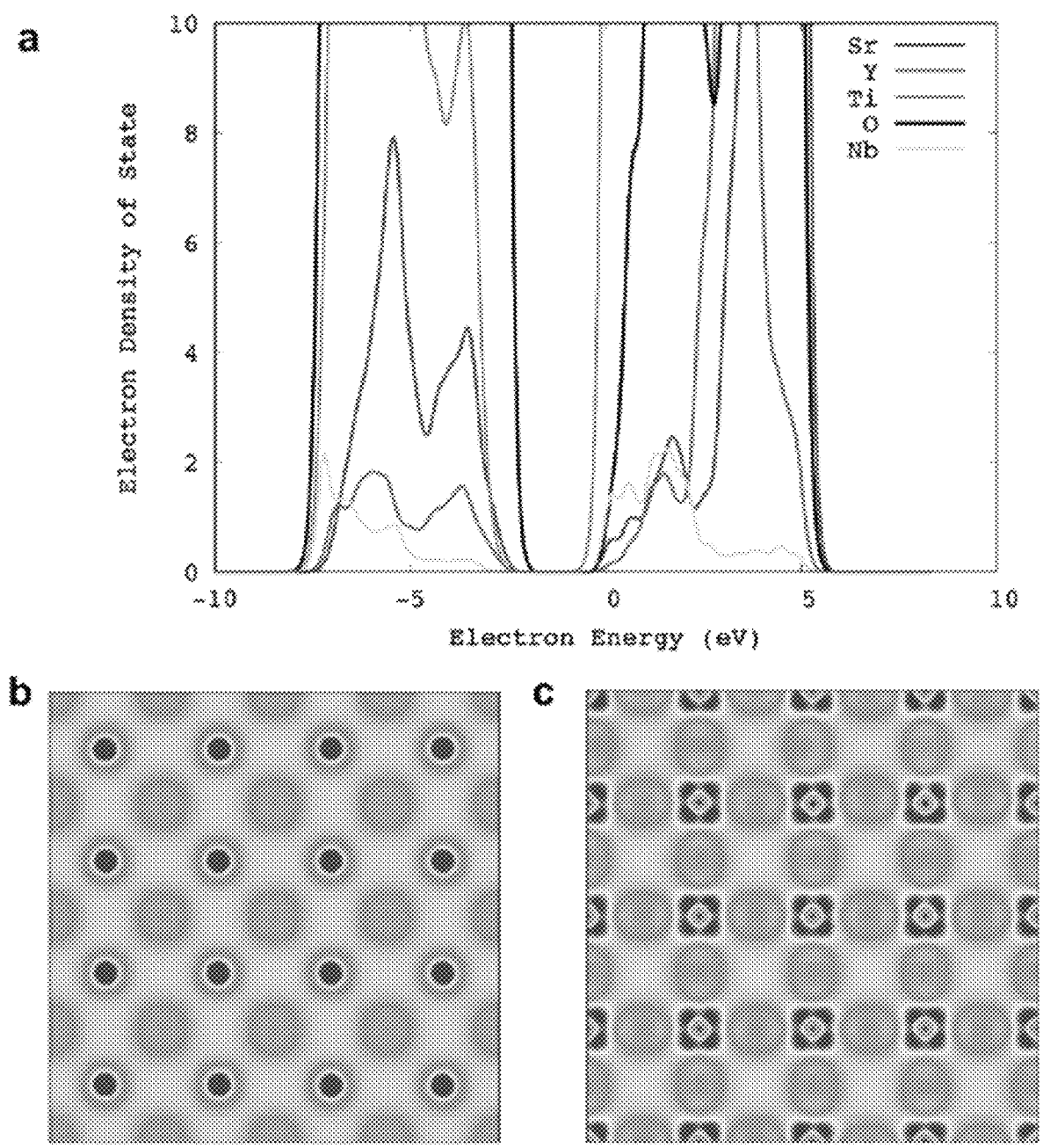
FIG. 9 shows electronic structures of SYTN (Y0.08Nb0.02) at: (a) electron density of state; (b) A-O plane, and (c) B—$O_2$ plane.

To further understand the electrical property and role of dopants in the charge compensation and redistribution within SYTN, first-principles calculations were performed on the supercells constructed with nearly 8% Y and 2% Nb. FIG. 9 shows electronic structures of SYTN(Y0.08Nb0.02). FIG. 9 at (a) shows electron density of state. Fermi level (0 eV) is shifted to the conduction band, with major contributions of e-DOS from Ti, O and Nb. Differential charge density upon Y and Nb doping slicing through FIG. 9 at (b) A-O plane and FIG. 9 at (c) B—O2 plane. Yellow and blue regions represent the electron gain and loss. Major electron density redistribution occurs on B-site Ti/Nb (reduction) and O-site (oxidation), making B—O bonds less ionic. The e-DOS in FIG. 9 at (a) reflects the extrinsic n-type electronic conduction mechanism, with free electrons near Fermi level (0 eV) mostly coming from the conduction bands of Ti, O and Nb. Indeed, those ions have redox capability, while Y and Sr do not. The Nb and Y dopants shift the intrinsic Fermi level in STO towards the conduction band, making semiconducting STO more electronically conductive. This e-DOS analysis agrees with XPS analysis qualitatively. Further analysis of differential charge density before and after doping indicates, see FIG. 9 at (b) and (c), that Nb and Y ions donate free electrons to all Ti 3d orbitals. Meanwhile, O 2p orbitals slightly lose electrons to Ti 3d orbitals due to Ti$^{3+}$'s electrostatic attraction. This gives rise to less ionic bonds between Ti and O ions. Despite redistributions in Ti 3d and O 2p shape charge density, the charge densities of A-site Sr/Y ions are almost intact and relatively inert to the electronic conductivity. To conclude, with Nb and Y doping, STO changes from a semiconductor to metal with a large-polaron electron conduction mechanism on the Ti/Nb and O sites.

For the current disclosure, phase composition, electrical conductivity and sintering behavior of Sr1−xYxTi1−yNbyO3 (0≤x, y≤0.1) series have been systematically studied. Based on the results obtained, SYTN(Y0.08Nb0.02) is selected as the IC material for anode supported SOFCs. A bilayer concept of an IC consisting of LSM/SYNT has also been studied to overcome the low air-conductivity of SYTN by leveraging the high air-conductivity of LSM. A full characterization of the bilayer IC on a porous YSZ/Ni substrate reveals a dense microstructure in the bilayer LSM/SYTN, excellent physical and chemical compatibility within the adjacent materials, and low ASR and oxygen permeability. Overall, the bilayer LSM/SYTN has been successfully demonstrated as a promising ceramic IC for low-cost anode-supported tubular SOFCs.

FIG. 17 shows a tubular stack of solid oxide fuel cells 1700 and one fuel cell 1702 of the current disclosure including interconnect 1704, cathode 1706, electrolyte 1708, hydrogen flow 1710, air flow 1711, anode support 1712 and an exploded view 1714 of interconnect 1704 showing a bilayer of La0.8Sr0.2MnO3−δ (LSM) 1716 for a top-layer and a bottom layer of SYTN(Y0.08Nb0.02) 1718 over a Ni-YSZ anode substrate 1720.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for forming a fuel cell ceramic interconnect comprising:
    preparing at least one Sr1−xYxTi1−yNbyO3−δ powder via a solid state reaction via ball milling SrCO3, Y2O3, TiO2, and Nb2O5 in ethanol;
    ball milling the Sr1−xYxTi1−yNbyO3−δ powder, isopropanaol, polyvinyl butyral, triethannolamine and polyethylene glycol to form a slurry;
    dip-coating the slurry onto an external surface of a porous anode substrate followed by drying to form a Sr1−xYxTi1−yNbyO3−δ layer on the porous anode substrate; and
    dip-coating a La$_{0.8}$Sr$_{0.2}$MnO$_3$ slurry onto the Sr1−xYxTi1−yNbyO3−δ layer on the porous anode substrate and drying to form a multilayer ceramic structure; and
    wherein an interconnect is formed by layering the La$_{0.8}$Sr$_{0.2}$MnO$_3$ onto the Sr1−xYxTi1−yNbyO3−δ layer to provide the interconnect with a top layer of La$_{0.8}$Sr$_{0.2}$MnO$_3$ over a bottom layer of Sr1−xYxTi1−yNbyO3−δ over the porous anode substrate.

2. The method of claim 1, wherein
x=0.05, 0.08, or 0.10; and
y=0.01, 0.02, 0.03, 0.05, or 0.10.

3. The method of claim 1, wherein the anode substrate comprises Ni-YSZ.

4. The method of claim 1, further comprising forming a solid oxide fuel cell containing the ceramic interconnect.

5. The method of claim 1, further comprising forming the ceramic interconnect to have an electrical conductivity requirement of $\geq 1$ S cm$^{-1}$.

6. The method of claim 1, wherein the ceramic interconnect is Cr free.

7. The method of claim 1, further comprising forming the ceramic interconnect to have area specific resistance ranging from 0.580 to 0.125 $\Omega$cm$^2$ at 600 to 800° C.

* * * * *